April 6, 1943.  R. M. STARRETT  2,315,908
CALCULATING MACHINE
Filed Feb. 23, 1939  8 Sheets-Sheet 2

INVENTOR
Rupert M. Starrett
BY
Wooster & Davis
ATTORNEYS

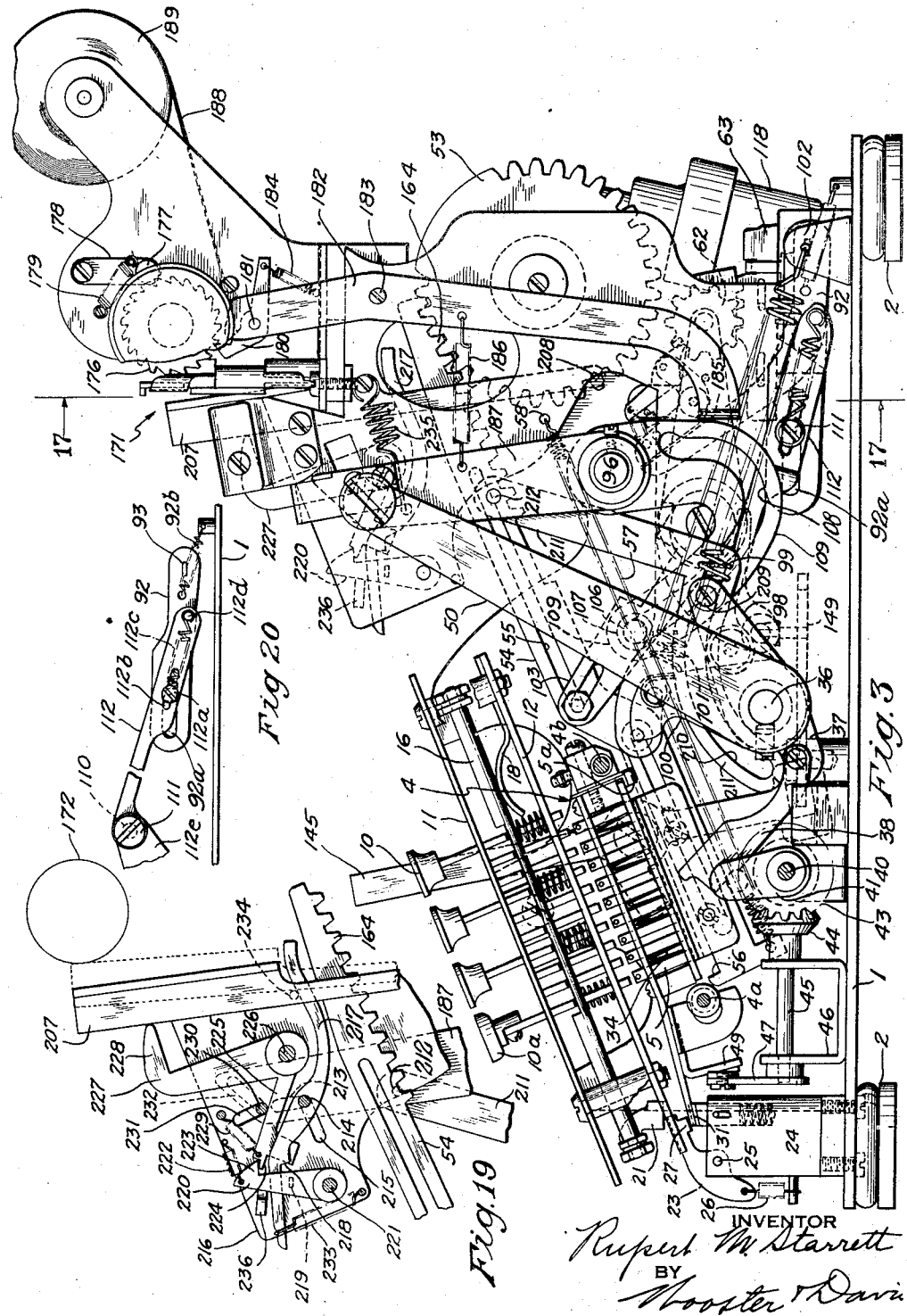

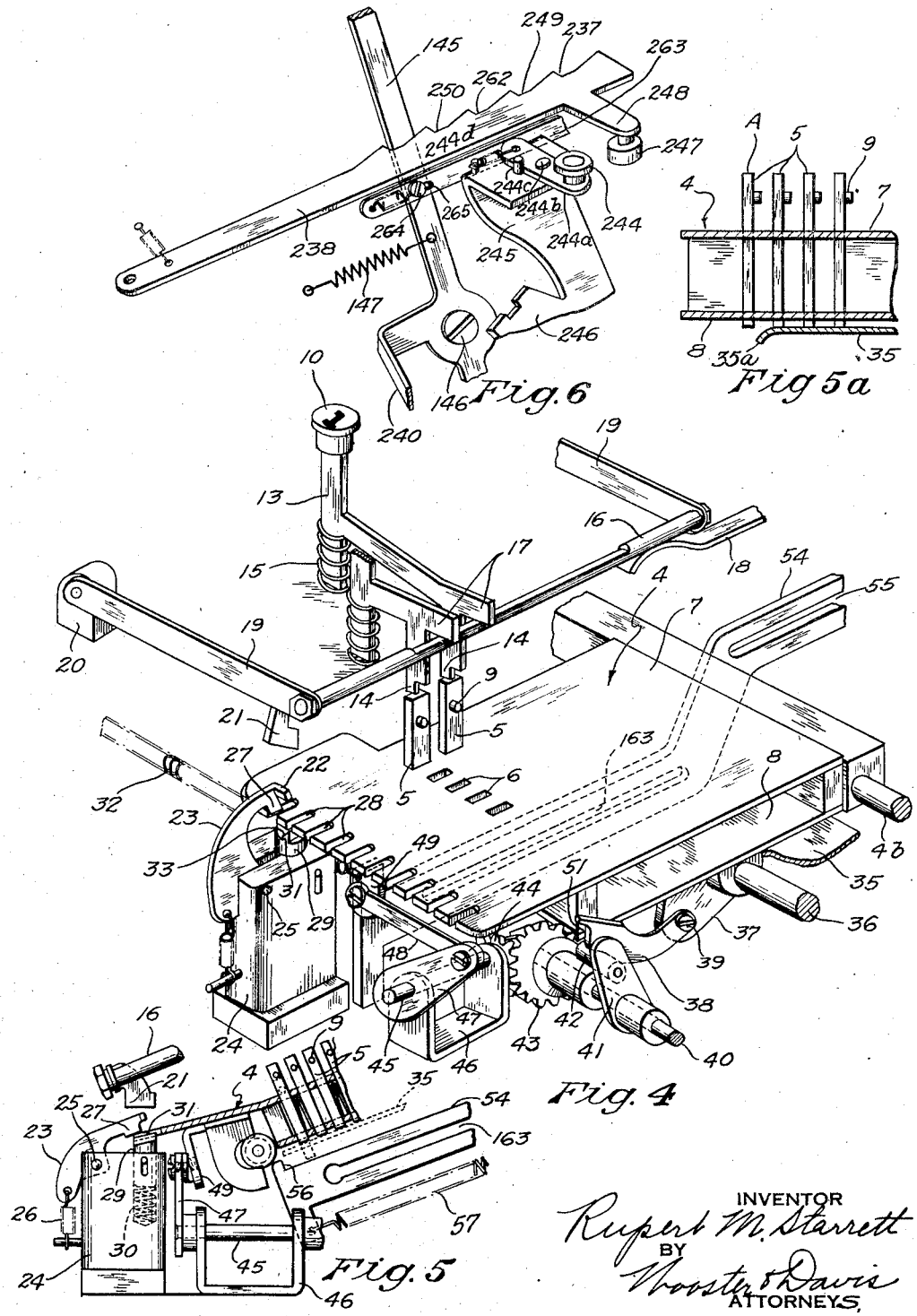

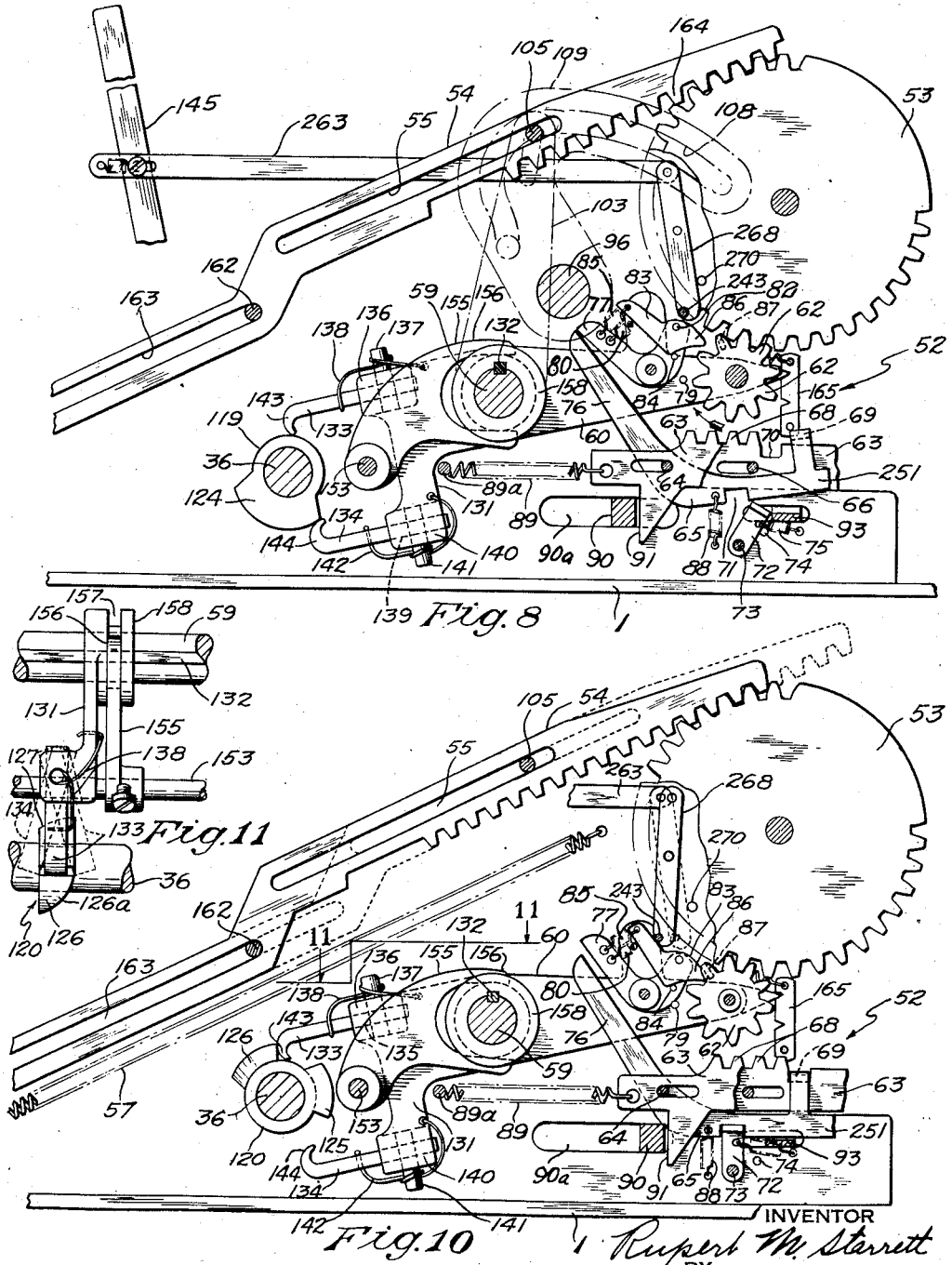

April 6, 1943.  R. M. STARRETT  2,315,908
CALCULATING MACHINE
Filed Feb. 23, 1939  8 Sheets-Sheet 7

INVENTOR
Rupert M. Starrett
BY
Wooster Davis
ATTORNEYS.

April 6, 1943.    R. M. STARRETT    2,315,908
CALCULATING MACHINE
Filed Feb. 23, 1939    8 Sheets-Sheet 8
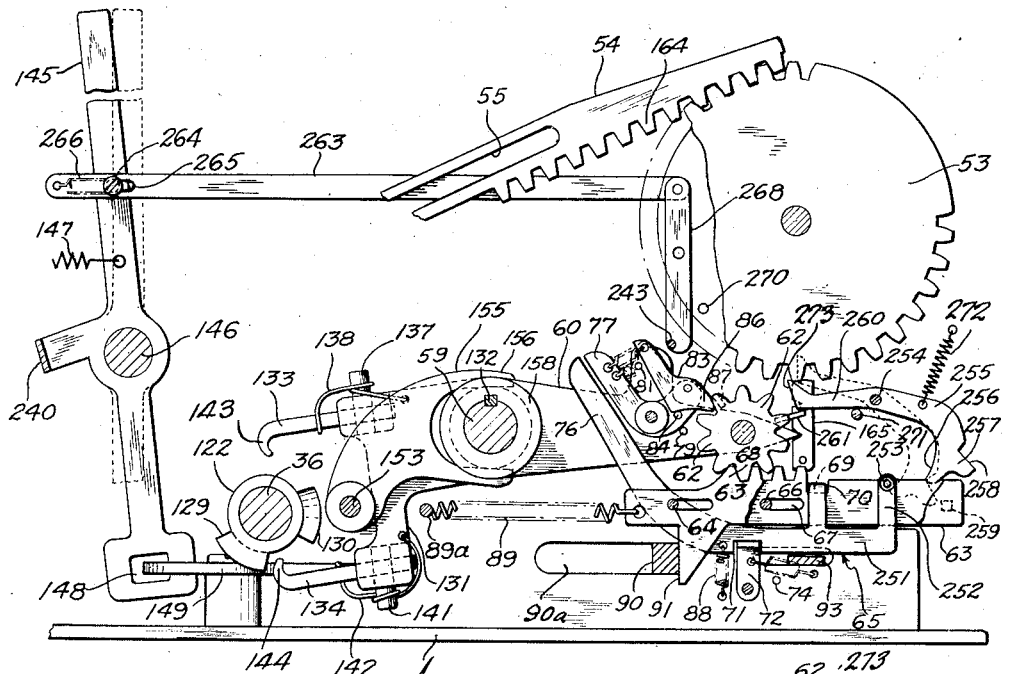
Fig. 15
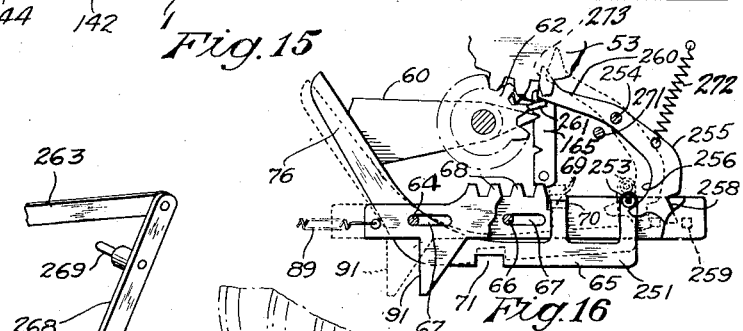
Fig. 16
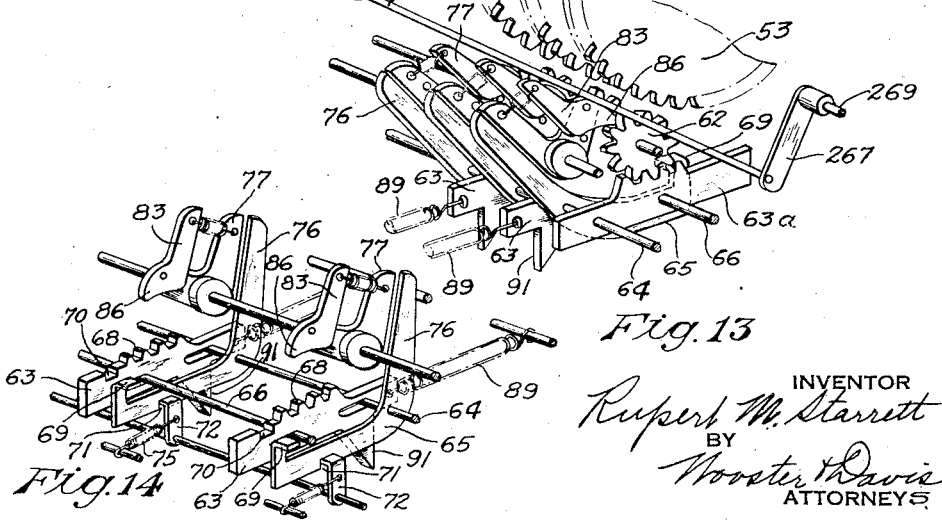
Fig. 13
Fig. 14
INVENTOR
Rupert M. Starrett
BY
Wooster Davis
ATTORNEYS Patented Apr. 6, 1943

2,315,908

UNITED STATES PATENT OFFICE 2,315,908

CALCULATING MACHINE

Rupert M. Starrett, Bridgeport, Conn., assignor of thirty per cent to John Kovats, ten per cent to John J. Kovats, and eleven per cent to George C. Johnson, all of Fairfield, Conn.

Application August 23, 1939, Serial No. 291,503

21 Claims. (Cl. 235—133)

This invention relates to calculating machines, more particularly to adding machines and especially to adding machines of the portable type employing preferably not more than ten major or digit keys in the keyboard, and has for its principal object to provide an improved carry or transfer mechanism that will directly subtract by action of the same carry pawls used in addition thus giving a greatly simplified construction so that the number of parts is greatly reduced, greatly reducing the total number of parts required in the machine making it more simple and reliable in operation and therefore less likely to get out of order, and thus reducing the cost of manufacture, reducing the size and weight of the machine and greatly simplifying the servicing operations.

It is also an object to provide an improved and simplified mechanism associated with the carry mechanism for performing subtracting operations, and one in which the carry pawls act separately from the differential actuator or adding rack bars so as to directly subtract without changing the action of the carry pawls.

It is a further object to provide a construction in which the carry racks determine the normal position for the adding wheels (that is, they hold or lock the adding wheels in their normal position which is their position of rest before the machine is operated) so as to permit getting the carry in both forward and reverse movements of the racks from and back to this normal position thus giving the carry in both addition and subtraction by the same elements without requiring a setting-up operation of the racks for either addition or subtraction.

With the foregoing and other objects in view I have devised a construction as illustrated in the accompanying drawings forming a part of this specification. It will, however, be understood that various changes and modifications may be employed within the scope of the invention.

In these drawings:

Fig. 3 is a side elevation with the outer casing removed and showing the parts in their normal positions;

Fig. 4 is a perspective view of a portion of the pin stop carriage and showing its relation to some of the operating keys;

Fig. 5 is a detail vertical longitudinal section of the front end of this carriage showing the escape mechanism in elevation;

Fig. 5a is a detail sectional view through a portion of the carriage and the pin restoring cam plate;

Fig. 6 is a perspective view showing the details of the holding mechanism of the main control lever;

Fig. 8 is a longitudinal vertical section substantially along the line 8—8 of Fig. 7 but showing the control lever in adding position, the main operating handle being in the forward position so that the totalizing or adding wheels are in mesh with the differential gears, and also showing a carry set up in one of the carry rack bars;

Fig. 10 is a similar view showing the parts in the operation of taking a total and in their positions when the main operating lever is in the forward position;

Fig. 11 is a top plan view of the cam and associated parts for taking a total, the view being substantially on the line 11—11 of Fig. 10;

Fig. 13 is a perspective view of a portion of the adding or totalizer mechanism somewhat expanded for illustrative purposes;

Fig. 14 is a perspective view of a portion of the carry rack bars looking from the opposite direction of Fig. 13;

Fig. 15 is a view similar to Fig. 8 showing the parts in normal position and with mechanism for performing the subtracting operation;

Fig. 16 is a side elevation of a portion of the mechanism of Fig. 15 illustrating another position certain parts assume in the operation;

Fig. 19 is a side elevation showing the operating mechanism for one of the printing bars to make an impression on the recording tape; and Fig. 20 is a detail side elevation of the connection for operating the restoring bail for the carry rack bar and the resetting bar for the holding pawls of the rack bar locking levers.

Figure 1:
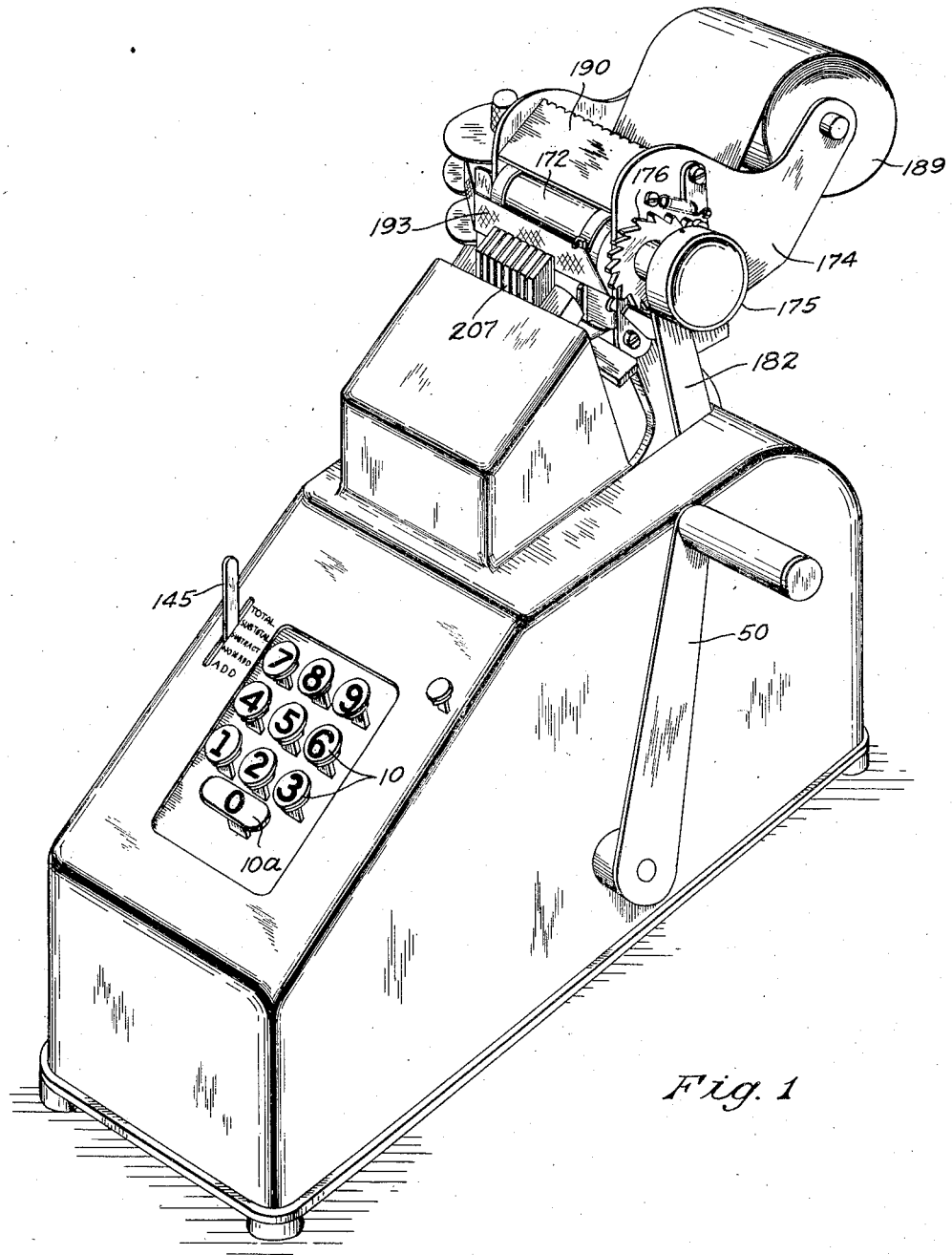
Fig. 1 is a perspective view of the machine.

The machine comprises the base 1 on which the mechanism is mounted, and the base may be set on suitable supports or legs 2 which may be of rubber or other suitable material. Mounted on this base and extending upwardly therefrom are suitable side frames 3, and it will be noted that practically all the operating parts with the exception of certain external control parts are located within these side frames.

*Digit setting-up mechanism and keyboard*

The digit setting up mechanism is shown more clearly in Figs. 2 to 5 and comprises a transversely reciprocable carriage 4 carrying rows of pin stops 5. It will be noted there are nine pins in each longitudinal row one for each digit 0 to 8. In the present case there are eight of these horizontal rows permitting use of numbers of eight figures, but this can be varied as desired. There are no pins to be depressed by the 9 key, the stationary stop 5a acting in place of a stop pin for this key, but its operation will depress the bail 16 to operate the escapement 27. These pin stops are mounted in guide openings 6 in upper and lower spaced plates 7 and 8 of the carriage and when depressed project from the lower side of the lower plate 8 to limit the movement of certain differential actuator or adding rack bars as will later be described. Each stop pin has a lateral projection 9 to engage the top of the plate 7 and limit downward movement of the pin. The pins are operated by the keys 10 in the keyboard comprising an upper plate 11 and a lower plate 12 through which the stems 13 of the digit keys pass. Each key also has an extension 14 (Figs. 3 and 4) projecting below the lower plate 12 in alignment with one of the transverse rows of pins 5 (with the exception of the 9 key as will be explained) so as to engage the tops of the pins one at a time to depress a selected one of these pins when the key is depressed. The keys are urged to their upper or normal position by coil springs 15 and the keys remain depressed only when held by the finger of the operator.

Figures 2, 2A:
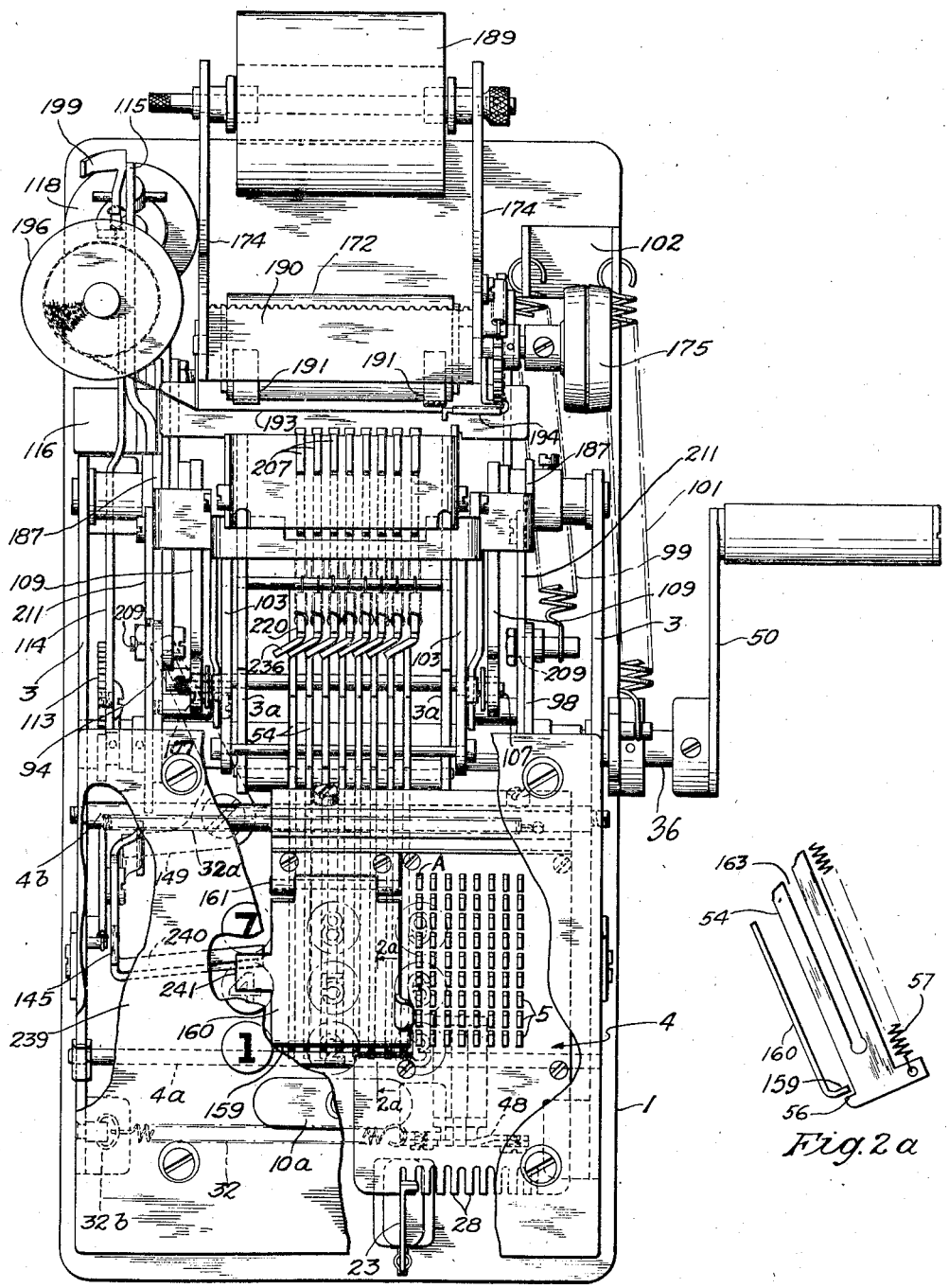
Fig. 2 is a top plan view thereof with the outer casing removed and with parts broken away to more clearly show the construction.
Fig. 2a is a detail view of the differential operator bar blocking means taken substantially on line 2a Fig. 2.

Running lengthwise between the upper and lower plates 11 and 12 is a bail rod 16, and each digit key has an extension 17 which is disposed over this bail rod so that on depression of any key this bail rod is also depressed, it being held in its upper position by a flat spring 18. The bail is mounted on suitable arms 19 pivoted on brackets 20, and on the forward arm 19 is a detent finger 21 adapted to engage a lateral lug 22 on an escapement pawl lever 23 pivoted in a supporting stand 24 at 25 and held in its upper position by a spring 26. At its upper end this lever has a stop lug 27 adapted to seat in any one of a series of laterally spaced notches 28 in the forward edge of the plate 7 of the pin stop carriage. At the under side of this plate is a stop pawl 29 mounted for vertical sliding movement in the support 24 and urged to its upper position by a spring 30. At its upper end it has a stop 31 to seat in the notches 28 and hold the carriage 4 against movement to the left by the springs 32 and 32a which are connected to the carriage at one end and to the left hand side frame 3 at the other end as shown at 32b (Fig. 2). The stop 31 is in alignment with the lug 27 on escapement lever 23 so that on depression of the lever 23 by the detent finger 21 operated by the bail 16 the lug 27 will enter the corresponding notch 28 and by engagement with the stop 31 will depress it out of the notch, but the carriage can not shift as it is held by the lug 27. Immediately, however, the pressure is removed from the digit key and the bail 16 moves to its upper position lug 27 is raised from the notch 28 permitting the carriage 4 to be shifted to the left by the springs 32, but it will shift only the distance between two adjacent notches 28 because the stop pawl 31 being released will seat into the next notch stopping movement of the carriage. To secure this action lugs 27 and 31 are slightly out of alignment so that when the carriage is held by lug 27 in a notch the lug 31 engages the underside of the plate slightly to the right of this notch. It will thus be seen the carriage is given a step by step movement to the left as the digit keys are operated, and the space between the notches 28 is equal to the lateral spacing between the longitudinal rows of stop pins 5 so that as the keys are operated the carriage is given a step by step movement to arrange the longitudinal rows of stop keys in successive denominational orders as will later be described. However, to permit the carriage 4 to be shifted to the normal or starting position by suitable returning mechanism later to be described, the left hand side of the stop 31 is inclined as shown at 33 so that it will be depressed by camming action of the edges of the slots 28 on return movements of the carriage to the right. The carriage is guided for transverse movements on the transverse bars 4a and 4b mounted in the side members 3 and extending between them. Located between the upper and lower plates 7 and 8 of the carriage are V-shaped springs 34 pressing at their opposite ends on adjacent stop pins 5 so as to yieldingly and frictionally hold these pins in their lower or depressed position after they have been depressed by operation of a digit key and will retain them in the depressed position until they are again raised or reset by the resetting cam plate 35 as will later be described.

If one or more keys 10 have been operated to depress complementary spring controlled pin stops 5 in the carriage and if it is desired to print the amount so recorded, as will later be described, the carriage must be restored to normal position in order to print the next succeeding amount desired. This will be more clearly understood from the mechanism shown in Figs. 3 and 4. Affixed to the main operating shaft 36 is an arm 37 carrying a dog 38 pivoted thereto at 39. Mounted in suitable bearings and extending transversely of the machine is a shaft 40 having affixed thereto an arm 41 carrying a pin 42. Also fixed to the shaft 40 is a beveled gear 43 meshing with a beveled gear 44 fixed to the shaft 45 mounted in any suitable means such as a U-shaped bearing bracket 46 mounted on the base of the machine. This shaft carries an arm 47 connected by a link 48 to a lug 49 on the carriage, this link being pivotally connected to this arm 47 and the lug 49. Also, for convenience the forward operating spring 32 may be connected to this lug as shown in Fig. 4. After the carriage has been moved one or more steps to the left as permitted by the escapement 23 under the action of the springs 32 and 32a during the setting up of a number on the keyboard, and this amount having been printed at the end of a forward movement of the main operating handle or lever 50 mounted on the main operating shaft 36, this lever is permitted to return to its rear or normal position. During the rearward movement of lever 50 the main operating shaft 36 is rotated clockwise and movement of the arm 37 actuates the dog 38 in such a manner that the cut out portion 51 at the end thereof engages the pin 42 on the arm 41 to turn the shaft 40 in the anti-clockwise direction. This turns the gears 43 and 44 and swings the link 48 to the right to thus return the carriage 4 to its normal position. Simultaneously with the return of this carriage to the normal position the stop pins 5 which have been depressed are restored to their raised or normal position by contacting or wiping against the down turned edge 35a (Fig. 5a) and being carried onto the upper face of the cam plate 35 which is so positioned with respect to the carriage that when the latter is in the normal or restored position it is over this plate and it has restored the stop pins to their normal position ready for the next succeeding operation. It should be noted, however, that while the carriage 4 moves sufficiently to the right to allow the cam plate 35 to restore all the stop pins 5 including the first row A of these pins there is sufficient rebound or backlash movement to restore the carriage to the left one step so as to leave the first or left hand row of stop pins open. In other words in the normal position the first row of pins 5 indicated at A, Fig. 2, does not overlie the cam plate 35 but is positioned as shown in Fig. 5a so as to allow the pins in this row to be depressed by operation of the desired keys 10 and allow the carriage to take its initial step to the left after which each succeeding row of stop pins will be similarly positioned and therefore similarly operable.

Figure 9:
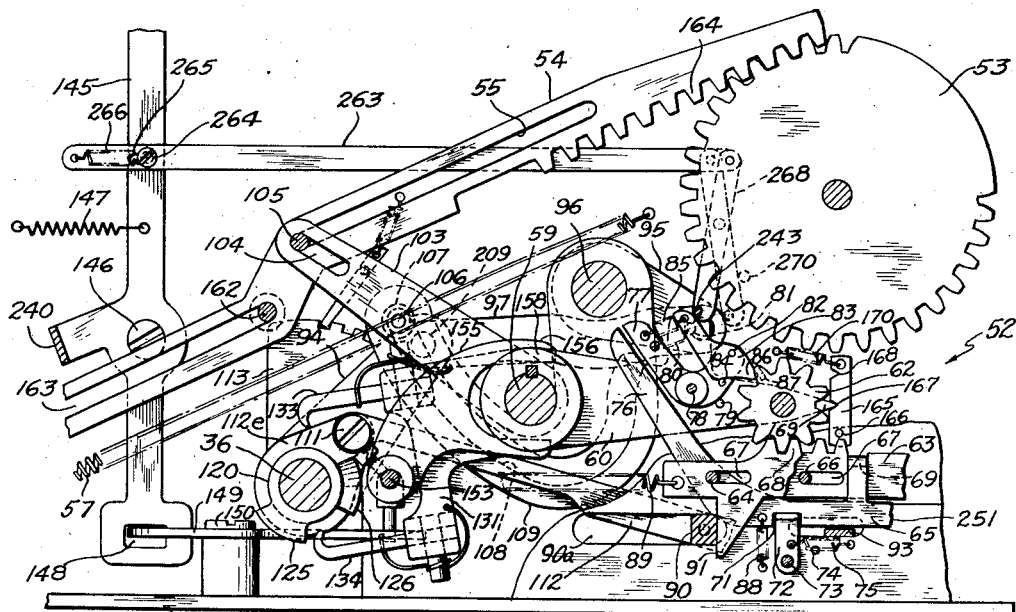
Fig. 9 is a similar view but showing the parts in their normal positions with the main control lever in the position to which it is moved preparatory to taking a total.

The differential actuating mechanism; accumulator, adding or totalizer mechanism and carry mechanism are shown more particularly in Figs. 7 to 16. Referring first to Figs. 7 to 10, Fig. 8 shows the elements set for adding and in the position they occupy when the main operating handle 50 is in the forward position and with a carry set up, while Fig. 9 shows the parts in normal position preparatory to taking a total operation with the main operating lever in its rear position, and Fig. 10 shows them during the taking of the total operation and the position they occupy when the main operating lever 50 is in the forward position.

This accumulator, adding or totalizer mechanism is shown generally at 52 and includes differential actuating mechanism comprising a series of gears or wheels 53 constantly meshing with a series of movable differential actuator bars or adding rack bars 54. These rack bars each have a longitudinal slot 55, and have at their forward ends an angularly upward extension forming a limit stop or shoulder 56 (Fig. 3). Each bar is urged in a direction rearward of the machine by a spring 57 extending from the forward end portion of the bar to a suitable fixed transverse anchor rod 58 extending between the side frames. As the gears or wheels 53 also are connected with and operate printing mechanism, later to be described, they can also be termed printing wheels. Journaled within the side frames 3a is a keyed shaft 59 having right and left rearwardly extending arms 60 carrying an accumulator or totalizer comprising a series of adding wheels 62 capable of meshing with the differential actuator wheels 53 and with carry mechanism cooperating with said adding wheels. These adding wheels correspond in number to the differential actuator wheels 53 and normally are seated in movably mounted carry racks 63 of a carry mechanism. These racks in the present construction are on bars preferably mounted for sliding movement as shown, but may be mounted in other ways to secure the desired movement for carry operations as will presently be described. The arms 60 are adapted to intermittently raise the adding wheels 62 out of engagement with the carry rack bars 63 into engagement with the differential actuator gears 53, and to shift them downwardly out of engagement with the differential gears 53 and into engagement with the carry rack bars 63 as will be more fully described later.

Pivotally mounted within the side frames 3a on a shaft 64 fixed in these side frames is a series of locking levers or carry release pawls 65 for locking the carry rack bars 63 in their normal or non-carrying position, and corresponding in number to the adding wheels 62. This shaft 64 and a second fixed shaft 66 support the carry rack bars 63 in convenient slots 67 in these bars and allow the bars to move forward and rearward a distance which is approximately equal to the pitch or the distance between the teeth of the adding wheels 62 which are normally in mesh with suitable rack teeth 68 on the upper edges of the carry rack bars 63. It should be noted that the first carry rack bar 63a (Fig. 13) is not movable but remains in the fixed position, there being no carry necessary into the first wheel as will be pointed out later. The locking levers or pawls 65 at their rearward portions each have a laterally extending lug 69 which normally rests in a dwell or recess 70 provided therefor in the top edge of the next succeeding carry rack bar to the left of each locking lever 65. In the bottom edge of each locking lever is a dwell or recess 71 in which is normally positioned a spring urged pawl 72, these pawls being pivotally mounted on a shaft 73 fixed within the side frames of the machine. These pawls are limited in their rearward movement by fixed stops 74 and are connected with springs 75 tending to shift them rearwardly against these stops. The levers 65 include upwardly and forwardly extending portions 76 in position to be operated by trip levers 77 pivoted on a transverse shaft 78 carried by the arms 60 and which are normally urged against a stop 79 by a spring 80 connected to the lever 77 and a fixed stop 81 carried by and extending between the side arms. Pivotally mounted on each lever 77 at 82 is a blocking pawl 83 normally urged against a stop 84 by a spring 85, and each of these blocking pawls has a projecting cam portion 86 lying in the path of a laterally extending lug 87 carried by the adding wheel 62 next to the right of each lever 65. The wheels 62 each have ten teeth, one for each digit in a denominational order including zero, and the lug 87 is on the tenth or zero tooth.

The locking levers 65 are normally urged clockwise, or that is, the right hand portions downwardly, by a spring 88 to normally hold them in interlocked engagement with the carry rack bars 63, or that is, with their lugs 69 in the recesses 70 in their respective carry rack bars. Springs 89 connected one with each of the movable carry rack bars 63 tend to shift these bars forwardly when disengaged from the lugs 69 of their respective locking lever or pawl 65, and each locking lever 65 is held in the unlocked position by its pawl 72 being shifted rearwardly out of the recess 71 to lie under the lower edge of the lever 65 as shown in Fig. 8. If the bars 63 have been unlocked they may be restored to normal position by means of a slidably mounted restoring bail 90 adapted to engage downwardly extending shoulders 91 on the bars 63. This restoring bail 90 has connected thereto through slots 92a links 92 (Figs. 3 and 20) also connected to a restoring bar 93 to the rear of the pawls 72, which on its forward movement engages the rear edge of any tripped pawl 72 and restores it to the upright or locking position and in position to seat in the recesses 71 in their respective locking levers. To insure complete release of the racks, when lever 76 is operated it is given somewhat greater movement than that necessary to merely carry lug 69 out of the recess 70 in the rack bar 63 and also release pawl 72. Thus when lever 76 comes back to permit lug 69 to rest on top edge of rack bar 63 notch 71 can receive the upper end of pawl 72 sufficiently to retain it in normal or upright position until the rack 63 is restored to normal. Then lug 69 drops into notch 70 and pawl 72 merely remains in notch 71. Each end of bail 90 is connected to an operating link 112 by a screw 112a passing through a slot 112b in each link and the slot 92a in link 92, a spring 112c is secured to the screw 112a and to the link 112 at 112d. This permits a certain amount of lost motion between bail 90 and links 92. The springs 112c are much stronger than the tension of all the springs 89 on the carry rack bars 63 so that if for any reason the carry racks are held up there will be no objectional strain on the adding section. The links 112 are connected at 111 to studs 110 on arms 112e (Figs. 7 and 20) fixed to main shaft 36 so as to operate bail 90 and restoring bar 93 by operation of this shaft. Springs 92b connected to links 92 and base 1 act to shift these links and bar 93 rearwardly.

The adding control mechanism includes the main operating shaft 36 journaled in the main side frames 3 and on which the main operating lever 50 is mounted, and this shaft carries the control cams for controlling the adding, total, subtotal, subtracting and non-add operations. To the left of the machine and mounted upon the main operating shaft 36 is a control arm 94 (Figs. 7 and 9) extending upwardly and rearwardly from the shaft 36, and in substantial alignment therewith is a similar control arm 95 on the main cam shaft 96, and these two arms 95 and 96 are connected by a connecting link 97. At the right of the machine and fixed to the main operating shaft 36 is another arm 100 (Figs. 2, 3 and 7) to which is connected a heavy tension spring 101, the other end being anchored to the base 1 by any suitable means as a bracket 102. A third arm 98 is mounted on the shaft 36 and is connected by a spring 99 to the bracket 102 and assists spring 101 in returning the parts to normal position. Pivotally mounted on the keyed shaft 59 and extending upwardly and forwardly of the machine are two arms 103 suitably slotted as shown at 104 and carrying a loosely mounted rod 105 which passes through the slots 55 of the differential actuator or adding rack bars 54. Also mounted on each arm 103 by a stud 106 is a roller 107. This roller rides into right and left closed cams 108 in curved arms 109 which are fixed on the cam shaft 96. Also mounted on the shaft 36 and fixed thereto is an arm and segment 113 connected by a link 114 to an arm 115 pivoted on the base by the bracket 116 and which is in turn connected at 117 to a plunger of a suitable dash pot 118 pivotally mounted on the base 1 at 118a to control the speed of the return movement of the main operating shaft 36 and associated parts under the action of the main spring 101, and the spring 99.

Figure 12:
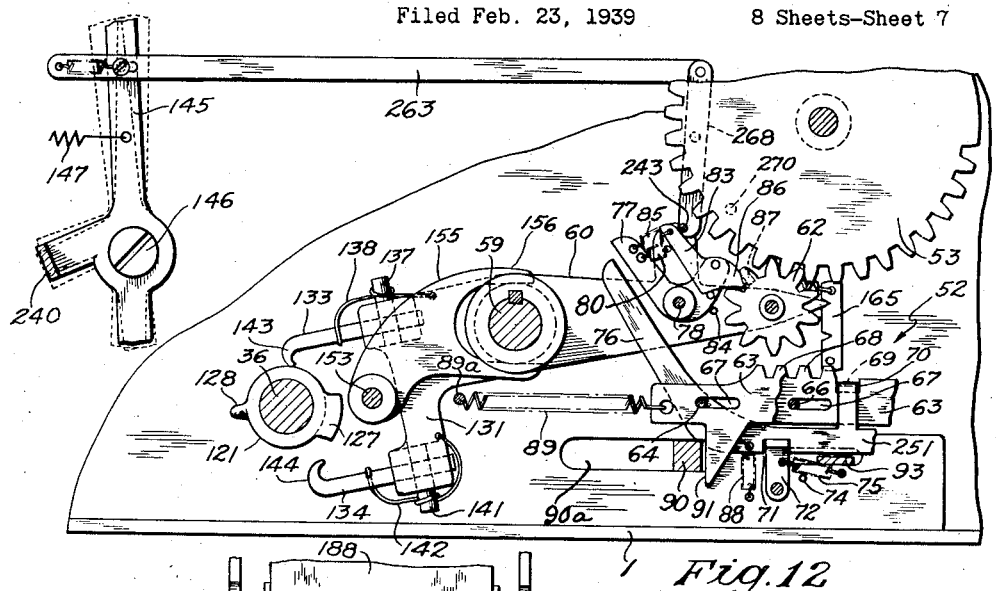
Fig. 12 is a view similar to Figs. 8, 9 and 10 with the main control lever in position for taking a subtotal and showing the positions of the parts when the main operating lever is in the forward position.

Mounted on the main operating shaft 36 and affixed thereto are a series of camming elements 119, 120, 121 and 122 (Fig. 7) respectively controlling the operations of listing or adding, total, subtotal and subtraction. The space indicated 123 between 119 and 122 is used to illustrate the relative position of certain other parts governing the non-add inclusion, all of these operations being more specifically described later. These cam elements are more clearly shown in Figs. 8, 9, 12 and 15. For example the adding cam 119 as shown in Fig. 8 has a single protuberance 124. The total cam 120 as shown in Figs. 9 and 10 has two protuberances 125 and 126 in spaced relation to each other. The subtotal cam 121 as shown in Fig. 12 has two spaced protuberances 127 and 128 and the subtraction cam 122 as shown in Fig. 15 has two spaced protuberances 129 and 130 similar to the protuberances for the total cam 120.

Mounted on the keyed shaft 59 and splined to this shaft so that it is longitudinally slidable thereon, but is keyed to turn the shaft, is a cam arm 131, the feather key being shown at 132. This permits the cam arm 131 to be slid back and forth on the shaft 59 to alignment with any of the cams 119 to 122 depending on which operation is desired, and this arm 131 is provided with means such as the extensions or fingers 133 and 134 to cooperate with the protuberances of the different cams for the different operations to be controlled by these cams. These fingers 133 and 134 as will be seen from Figs. 8, 9, 12 and 15 are located on opposite sides of the shaft 36 and are pivoted on the arm 131 for lateral rocking movement. The upper finger 133 is pivoted in a slot 135 in the boss 136 on the lever by means of the pivot pin 137 and is yeldingly held against the wall at the left hand end of this slot forming a stop by means of a spring 138, so that the finger is held against rocking movement up or down and to the left, but may swing to the right as shown in dotted lines Fig. 11. The lower finger 134 is similarly mounted in the slot 139 in the lower boss 140 by the pin 141, but it is held against swinging movement to the right by a shoulder at the inner end of the slot forming a stop, but is free to swing to the left as shown in Fig. 11 against the action of the spring 142 which tends to swing it to the right and hold it against the stop shoulder. Both fingers have inclined or curved ends 143 and 144 respectively so that they may ride upon the cam surfaces when they are in alignment with the protuberances of the cams and the shaft 36 is turned to operate the cams.

The selective positions of the cam arm 131 is controlled by the main control lever 145 which is pivoted on the left side of the frame at 146 and is normally urged forwardly by a spring 147. This lever is pivotally connected at 148 to a bell crank lever 149 pivoted at 150 on the base 1. The connection 148 comprises an opening in the lever 145 into which the end of the left arm 151 of the lever 149 projects permitting the lever 145 to swing the lever 149 on its pivot with a sliding connection between the arm 151 and the lever 145. The other arm of the bell crank lever 149 is slotted at 152 and is connected to a rod 153 slidable transversely in the side members 3a of the inner frame, and this rod has affixed to it an arm 155 having a fork 156 seated in the groove 157 in the boss 158 of the slidably mounted cam arm 131. Thus operation of the rod 153 will shift the arm 131 to bring the operating fingers 133 and 134 carried thereby into alignment with any of the cam members 119 to 122.

As shown the main operating shaft 36 and its associated parts are actuated by the main operating lever or handle 50 secured to this shaft. It is to be understood, however, that it is within the scope of the invention to use power operated or mechanical means in place of the manually operated handle 50, such for example as a motor bar operated by a suitable arrangement of gears operated by a motor, but for present purposes and for convenience in illustration the present form will be sufficient.

*Listing or adding and printing operation*

Assuming that the operator wishes to set up and list or print any desired number, in the showing of the present machine not exceeding eight digits, he first sets the main control lever 145 to its extreme forward or adding position. It is also assumed that before starting to list the first number the machine has been cleared either by a total taking operation or a forward movement of the main operating lever 50. The adding wheels 62 are then all in position with the transfer lug 87 of each on the zero tooth just in front of or against the forward side of the end 86 of the corresponding pawl 83 as shown in Fig. 9. If this is the first number or item set up, or if it is in addition to items already set up but is not sufficient to produce a "carry" with these numbers previously set up, the operation is as follows:

The proper keys 10 are depressed which operation correspondingly depresses the complementary stop pins 5 in the carriage 4 causing them to protrude from beneath the carriage. The first key depressed depresses the proper stop pin in the first longitudinal row of these pins A, the second key depressed depresses the proper stop pin in the second row, and so on until the whole number is set up, the carriage 4 moving during this operation in a step by step movement to the left according to the number of keys depressed and to move the longitudinal rows of stop pins 5 in succession from their position over the cam plate 35 to a position to permit depression of these pins.

This step by step movement of the carriage is controlled by the escapement 23 operated by the detent finger 21 through the bail rod 16. The stop pins 5 which have been depressed are now positioned with their lower ends in alignment with the stop shoulders 56 (Figs. 3 and 5) on the forward ends of the proper number of differential actuator bars 54. The movement of the carriage 4 to the left also carries the downwardly turned forward lip or edge 159 (Figs. 2 and 2a) of the differential actuator bar blocking or limit plate 160, pivotally mounted on the carriage 4 at 161, out of the path of movement of the limit stops or shoulders 56 of the differential actuator bars 54 corresponding to the digit orders of the number set up. Thus if the number has three digits the carriage will be shifted to the left three steps moving the blocking lip 159 from the path of movement of the stop 56 of the first three bars 54 at the right hand of the series.

The operator now moves the main operating handle 50 forwardly as far as possible or to the full limit of its forward movement. This turns the main operating shaft 36 in a counterclockwise direction and through the arms 94 and 95 connected by the link 97 turns the cam shaft 96 in a clockwise direction. This in turn moves the right and left closed cams 109 rearwardly and upwardly carrying with them the slotted arms 103 pivotally mounted on the shaft 59. These arms carry rearwardly the loosely mounted rod 105 which moves along the slots 55 of the differential actuator bars 54 until these parts reach the position substantially shown in dot and dash lines Fig. 8 and with the rod 105 at the forward end of the slots 55 of the differential actuator bars 54 which have not been unblocked. During this movement, however, the bars 54 which have been unblocked move rearwardly under the action of their springs 57, rod 105 acting as a guide therefor as well as the stationary rod 162 extending through a second slot 163 in each bar 54. The distance through which each of the unblocked differential actuator bars moves is determined by the limits 56 at the forward end of each bar contacting the stop pin 5 protruding from the underside of the lower plate of the carriage 4 which lies in its path, or if the key for the digit 9 has been depressed then the forward movement of the bar is determined by stop 56 engaging stop 5a. Since the bars 54 are toothed to form racks as shown at 164 and are meshed with the correspondingly toothed differential actuator or printing wheels 53, these wheels are rotated clockwise in accordance with the distance through which the corresponding bar 54 moves and which in turn depends upon the digit key 10 which has been depressed. Immediately preceding the completion of the forward movement of this listing stroke, or that is, the forward movement of the main operating lever 50, the protrusion 124 (Fig. 8) on the adding cam 119 on the main operating shaft 36 engages the end of the lower finger 134 of the cam arm 131 mounted on the keyed shaft 59, thus moving this shaft a short distance and anti-clockwise. By this movement the adding wheel arms 60, which are keyed to the shaft 59 and carry the accumulator comprising the series of totalizer or adding wheels 62, are raised carrying these adding wheels out of engagement with the carry rack bars 63 and into mesh with the differential actuator wheels 53. These wheels are held in this position by a simple temporary locking device 165 pivoted at 166 and having lower and upper notches 167 and 168 to receive the tapered projecting end 169 on either one or both of the arms 60, the locking device 165 being held in yielding locking position by a spring 170.

Figures 17, 18, 18A:
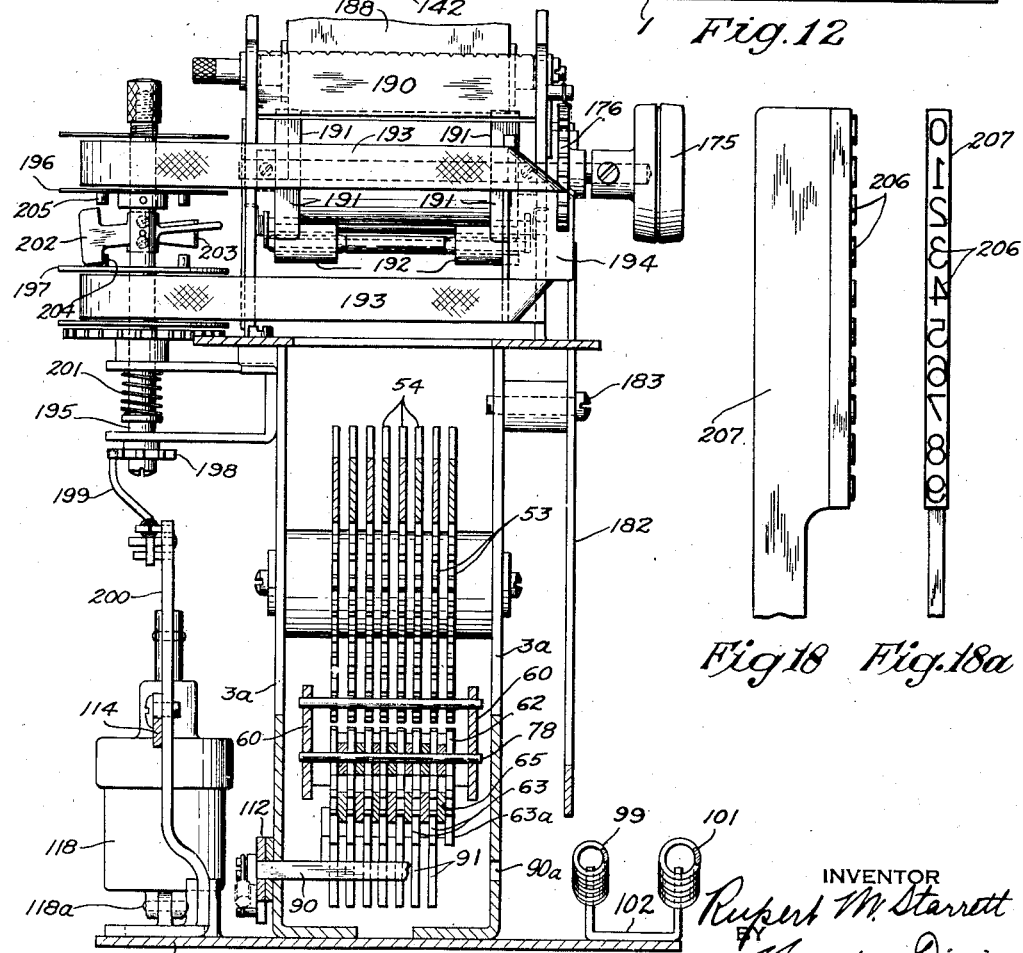
Fig. 17 is a vertical section substantially on line 17—17 of Fig. 3.
Fig. 18 is a side elevation of the upper end portion of the printing bar.
Fig. 18a is a front elevation thereof.

Simultaneously with the positioning of the desired amounts in the differential actuator or printing wheels 53 a printing mechanism indicated generally at 171 (Fig. 3) is brought into position to print the desired amount (see more particularly Figs. 1, 2, 3, 17 and 19). The printing mechanism consists of a rotatable printing roll or platen 172 mounted to rotate on bearings in the side members 174 of the frame. This platten may be operated by hand through a hand knob 175 and has on its shaft a toothed ratchet wheel 176 cooperating with a spring pressed roller 177 on a pivot arm 178, this roller seating between the teeth on the wheel 176 to hold the platten in different step by step movements, the roller being yieldingly held in this position by the spring 179. This platten is rotated in a step by step movement by a pawl 180 pivoted at 181 on an operating lever 182 pivoted to the frame at 183, the free end of the pawl 180 being held against the teeth of the wheel 176 by a spring 184. The lower end of the lever 182 has a laterally extending portion or lug 185 in alignment with one of the cam arms 109 on the shaft 96. A spring 186 connected to this lever 182 and one of a pair of levers 187 pivoted for free movement on the shaft 96 on opposite sides of the printing mechanism tends to swing the lever 182 clockwise on its pivot and retract the pawl 180 the distance corresponding to the spacing of adjacent teeth 176 in position to turn the platten one step on the next listing operation. As the main operating handle 50 is moved forwardly for a listing operation the cam 109 moves away from the lug 185 as this cam is swung clockwise permitting the spring 186 to swing the lever 182 to retract the pawl 180. However, as the cam arm 109 is swung back after the listing operation to the normal position of Fig. 3 at the end of the backward movement of the main operating lever 50 it engages the lug 185 to throw the lever 182 counterclockwise to cause the pawl 180 to turn the platten one step and bring the number which has just been listed to a visible position. This number is printed on a narrow paper tape 188 passing over the platen 172 from any suitable source of supply as a roll 189, this tape passing from the roll under the platten upwardly at the front side thereof behind a guide and tear off plate 190, the tape being guided around the platten by suitable spring guides 191 and rollers 192 (Fig. 17).

Movable transversely across the front of the platten is an inking ribbon 193 guided in suitable guides 194 and fed with a step by step movement across the front of the platten by a feed similar to a typewriter ribbon feed shown more clearly in Fig. 17. Mounted on a vertical shaft 195 are two ribbon spools 196 and 197, and on this shaft is a toothed ratchet wheel 198 operated with a step by step movement by a pawl 199 on an arm 200 connected with the lever 115 so that on each listing operation the pawl gives the wheel 198 one step of a step by step movement to turn the shaft 195 which is frictionally held against overrunning by a spring 201. Mounted on the shaft is a pivoted lever 202 which is held in either one of two positions by a spring 203. When it is in its lower position as shown in Fig. 17 it engages a stop lug or pin 204 to rotate the lower reel or spool 197 and draw ribbon from the spool 196 across in front of the platten. If the lever 202 is swung to bring it in front of the lugs or pins 205 on the spool 196 it will rotate this spool to draw the ribbon from the spool 197.

The type 206 (Fig. 18) for printing the digits for a number is mounted on a series of upright type bars 207, one for each of the differential actuator bars 54 and the wheels 53, each of these type bars being connected at its lower end to a corresponding wheel 53 by a pivotal connection 208 as shown in Fig. 3. As the wheel 53 is turned to the right or clockwise under the action of the actuator bar 54 according to the digit set up thereon the type bar connected with this wheel is raised a corresponding amount bringing the corresponding digit type 206 in front of the platten 172 and inking ribbon 193 preparatory to making an impression to print this digit on the tape 108. The type bars are not raised in preparation for printing zeros, but are normally in the zero printing position and are blocked out except when a zero impression is desired, as will be described presently.

The impression is made by the mechanism shown more clearly in Fig. 19. The arms 94 and 98 (Figs. 3 and 7) on the main operating shaft 36 carry studs or rollers 209 running in curved slots 210 in links 211 pivoted one to each of the arms 187 at 212. These arms 187 (there being one at the right and left hand of the printing mechanism) each have an upright slot 213 carrying a transverse rod 214 also passing through forwardly and downwardly inclined slots 215 in upward extensions 216 of the side members 3a of the inner frame. Pivoted on this rod 214 are a series of trip levers 217, one for each type bar, and forwardly of the rod 214 each of these levers is provided with a stop shoulder 218 normally out of alignment with a lug 219 carried by a catch lever or pawl 220 pivotally mounted at 221 and normally urged in a clockwise direction by a spring 222. Each lever 220 has a hook or lug 223 to engage an extending lug 224 on a bell crank lever 225 pivoted on a cross shaft 226. The other arm 227 of this lever has a hammer 228 back of its corresponding type bar 207, and this bell crank lever with its hammer is normally urged in a clockwise direction by a spring 229. Extending across the lower arms 225 of the bell crank levers is a rod 230 which is guided for up and down movement in slots 231 in the side members of the frame and also pass through inclined slots 232 in the levers 187. A spring 233 is connected to each lever 217 and tends to swing it counterclockwise on its pivot, that is, to pull its forward end downwardly. The right hand or rearwardly extending arm of each lever 217 lies under a laterally extending pin or lug 234 on its complementary type bar 207.

This printing mechanism operates at the end of the forward movement of the main operating arm 50 when it is operated for a listing operation. When this arm 50 is moved forwardly and a number is set up in the wheels 53 by the bars 54 as previously described the proper number of wheels 53 will turn clockwise an amount corresponding to the digit number set up in each. Each wheel thus rotated will raise the type bar 207 connected therewith a corresponding amount to bring the proper type digit 206 (Fig. 18) thereon in alignment with the platten 172 and inking ribbon 193. During forward movement of the main operating lever 50 the rollers 209 on the arms 94 and 98 swing with the shaft 36 and move along the curved slots 210, but as the levers 211 are pivoted at 212 these levers may swing and do not operate the levers 187 until just before the main operating arm 50 reaches the limit of its forward movement, which is after the corresponding digits have been set up in the wheels 53 and the printing bars 207 connected to the wheels 53 which have been operated are raised a corresponding amount. Then the rollers 209 engage the left hand ends of the slots 210 and the further forward movement of the main operating lever 50 operating through the levers 211 will shift the levers 187 forwardly. This movement of the levers 187 by movement of the cam slots 232 will raise the stop ball or rod 230 upwardly away from the bell crank levers 225. In the mean time raising of the type bars 207 has raised the stops 234 from the corresponding levers 217 permitting their springs 233 to draw the arms of these levers down against the stop 219 on the corresponding catches 220. Then as the levers 187 move forwardly they shift the transverse rod 214 forwardly in the slots 215 and carry with it the levers 217. This will cause the stop shoulders 218 on the levers which have been released by their type bars 207 to engage the lugs 219 on the corresponding catch levers 220 and swing these levers to the left away from the extensions 224 on the corresponding bell cranks 225. This will permit their springs 229 to swing the released bell cranks to the right or clockwise and through their hammers 228 swing the already set type bars 207 against the inking ribbon and platten to print the proper digits on the tape 188. Forward movement of the levers 217, however, which have not been released by upward movement of their type bars will not release their catches 220 as their stop shoulders 218 will merely pass over the lugs 219 on these levers without tripping the levers. As the main operating lever 50 moves backwardly from its forward position it releases the levers 211 and 187 permitting the springs 186 and 235 to swing these levers 187 to the right or clockwise thus restoring the levers 217, 227 and 220 to their normal positions, the levers 217 being shifted to their final positions by the stops 234 on the type bars as these bars are shifted to their lowermost position at the end of the rearward movement of the main operating lever 50.

If the number to be printed includes one or more zeros the proper type bars 207 must be released to permit printing this, the type bars as previously pointed out being normally in zero printing position but held retracted or inoperative for this purpose. To release the proper bars for printing zeros each catch or pawl 220 has a forwardly and laterally extending lug 236, each of which as seen in Fig. 2, lies in front of and overlaps the similar lug on the next catch 220 to the left. Thus if one catch 220 is released by being shifted forwardly it will release all of these catches 220 to the right of it. That is the lug 236 on the catch released by pushing on the lug of the next catch to the right will release it and this in turn will release the next one to its right and so on until all the catches 220 to the right of the first one released are also released. Thus supposing for example the number to be printed is 200. With this number the first two type bars at the right hand of the series will not be raised as no number is transferred to their wheels 53, and therefore the catches 220 of these two type bars would not be released by forward movement of their levers 217. However, the third type bar from the right would be released for printing the 2 as this was set up in its wheel 53 and this third bar raised accordingly. Therefore when the catch 220 for this third type bar 220 is released its lug 236 will release the catch 220 of the next type bar to the right or the second type bar and this will in turn release the next catch 220 to its right or the first type bar. Thus the first and second type bars are released to print the two zeros and the third prints the 2 giving the number 200. It will be seen that release of the third catch 220 and the third type bar will not release any type bar to the left of the one released and therefore no zero will be printed to the left of the 2.

As the main operating handle 50 is returned to its normal or rearward position under action of the main spring 101 and spring 99 and against the action of the dash pot 118, the protuberance 124 of the cam 119 (Fig. 8) engages the end of the upper finger 133 swinging the adding wheels 62 away from the wheels 53 back to their position of rest in the carry rack bars 63. As the closed cam arms 109 move forward (counterclockwise) the rod 105 carried by the slotted arms 103 rides forwardly in the slots 55 in differential actuator bars 54 until this rod engages the forward ends of the slots 55 of the bars 54 which have been released and shift them forwardly to return them to their normal position, at the same time restoring the energy to their springs 57. When these bars 54 are being returned through the same distance (or number of teeth) they have moved rearward they turn counterclockwise the printing wheels 53 in mesh therewith through the same distance or number of teeth, restoring them and the type bars connected therewith to their original or normal position, but during this backward movement of the wheels 53 before the lug 124 of cam 119 engages the finger 133 the adding wheels 62 remain in mesh with the gears 53 and therefore wheels 62 are turned clockwise an equal number of teeth, which is the number of teeth set up in the corresponding wheel 53 and in accordance with the digits of the number set up in the keyboard, thus setting up in or transferring to the adding wheels 62 the same amount or number thus set up in the keyboard, and which also corresponds to the amount printed on the printed tape. After this number is set up in the adding wheels 62 the projection 124 of the cam engages the finger 133 shifting the adding wheels 62 from mesh with the gears 53 to the normal position of rest in the carry rack bars 63 as shown in Fig. 9. Also, as the main operating handle 50 reaches the end of its rearward movement it has completed its first forward and rearward movements and the first cycle of operation for setting the machine for an adding and carry operation has been completed.

*Adding and carry operation*

It will be assumed by way of example that the first printing wheel 53 has been rotated from 0 to 9, or to carry it one step farther, the first two printing wheels have each been rotated from 0 to 9 so that the two together are changed from 00 to 99, and if it is desired to add a single integer, for example 1, to the amount already recorded and printed, that is the 99, if the operator is to procure a total of 100 it is required of the machine that the 99 be changed to 00 and the 1 be transferred in front of it. In other words the 1 is added to each 9 or once carried through each 9 to set up the machine for the total of 100. This is done in the following manner.

It will be assumed that the machine has been operated as above described and that the 99 has been set up in the first and second printing wheels 53 and also printed on the tape and the parts have been returned to normal by movement of the main operating handle 50 and the parts connected therewith to normal. During this operation the 99 has been recorded in the first and second adding wheels 62. As previously described the adding wheels 62 each comprise ten teeth and the camming lug 87 is on and projects laterally from the side of the tenth tooth of each wheel, and as this camming lug is just rearwardly or to the right of the end 86 of the pawl 83 in the normal position when no numbers are set up in the machine as shown in Fig. 9, when a 9 is set up in a wheel this lug 87 in effect has been shifted through nine teeth in a direction clockwise to a position one tooth forwardly of its original position, or that is beneath the end 86 of the pawl 83. The operator now desiring to add the single integer, namely 1, strikes the first key in the keyboard and moves the main operating handle 50 forwardly setting up the 1 in the first wheel 53 under the action previously described. At the end of this forward movement of the main operating handle the adding wheels 62 are raised by cam 124 into mesh with the differential actuator or printing wheels 53. When the handle 50 is permitted to return to normal position this will transfer the 1 set up in the wheel 53 to the first adding wheel 62 and will move this first adding wheel clockwise a distance of one tooth, or that is, one integer. During this movement the cam lug 87 on this wheel trips the pawl 83 as shown in Fig. 8. This action through the bell crank 77 trips the lever 76 raising the laterally extending lug 69 on this lever out of the dwell or notch 70 in the next succeeding or second carry rack bar 63 (which is the first movable bar), where the lever is held in this raised position by the pawl 72 (see Fig. 8) which has been shifted rearwardly by its spring 75. This will unlock the second adding rack bar 63 and if it is shifted forwardly by its spring 89 as shown in Fig. 8 it will be moved back and held by the bail 90 engaging the stop 91 on the bar before the adding wheels 62 are shifted to engagement with the rack bars. At the end of the rearward movement or return stroke of the main operating handle 50 the adding wheels 62 again come to rest in their respective carry rack bars 63 under the action of the cam 124. It will therefore be seen that the integer 1 has been printed, added to the first 9 (first adding wheel) and this adding wheel is restored to its 0 or normal position with its lug 87 rearwardly of or above the nose of the pawl 83 as shown in Fig. 9. This is the result of a manual operating of a forward and return stroke of the main operating handle 50.

The first carry rack bar 63a being fixed as previously described it yet remains for the integer 1 to be carried to and added to the second adding wheel 62, which in the example taken already has a 9 in it, to thus change the second 9 to 0 also, as has been done with the first wheel with its 9, and "carrying" the integer 1 to and setting it in the third adding wheel 62 to move it from the zero to the 1 position so that when a total is taken it will read "100" on the printing tape. This is accomplished as follows:

Without setting anything further up in the keyboard a clearing or resetting stroke is taken, that is a single forward and rearward movement of the main operating handle 50 or blank cycle is taken. It should be remembered that before this operation the second carry rack bar 63 is still unlocked from the lever 65 but this bar is held in its rearward or normal position by the bail 90 engaging the shoulder 91 on this rack bar. As the links 112 move forwardly with the operation of the main operating handle they shift with them the bail 90, and the unlocked carry rack bar 63 moves forward by the action of its spring 89 attached thereto a distance equal to the length of the slots 67 which is equal to the distance between two adjacent teeth of the rack bar, or that is, two adjacent teeth of the adding wheel 62 corresponding to one integer.

During this forward movement of the unlocked bar 63 the second adding wheel 62 which is in mesh with the teeth of this rack bar is turned clockwise one tooth, and since in our example the cam lug 87 on the second adding wheel 62 was just forwardly of or under the nose of the pawl 83 of the second locking lever 65 (that is the lever between the second and third adding wheels 62) this movement of one tooth given to the second adding wheel 62 by movement of its second adding rack bar 63 will cause the lug 87 on this second adding wheel to trip the pawl 83 and the locking lever 65 between the second and third adding wheel, thus unlocking the carry rack bar 63 for the third adding wheel 62 by removing the lug 69 of this second lever 65 from the notch 70 in the third carry rack bar. This release of the third carry rack bar 63 permits it to be moved forwardly by its spring 89 the distance of one tooth, and as it is in mesh with the third adding wheel 62 it will rotate this third wheel clockwise one tooth changing it from 0 to 1. Since nothing has been recorded in this third adding wheel 62 in the example taken it cannot further extend the "carry," but if the numbers involved were large enough to require it the carry would be simultaneously extended to further carry rack bars and adding wheels to set up the proper number in the adding wheels. At the end of the forward movement of the main operating handle 50 the cam 124 shifts the adding wheels 62 from mesh with the adding rack bars 63 to mesh with the differential actuator or printing wheels 53, but before this takes place the proper carry has been fully set up in the adding wheels 62. These adding wheels 62 remain in mesh with gears 53 during the greater part of the return or reverse movement of the main operating handle 50, but as nothing has been set up in the bars 54 and wheels 53 the adding wheels 62 are merely held and are not given any rotary movement during the return movement of this rotary handle.

This restoration or rearward movement of the main operating handle 50 causes the restoring bail 90 to abut the shoulders 91 of the second and third carry rack bars 63 (the only ones which have been unlocked and moved forwardly) restoring them to normal, but as during this restoring movement of these carrier bars 63 the adding wheels 62 are in mesh with the wheels 53 and therefore out of mesh with the carry rack bars this restoring movement of the carry rack bars will have no effect on the adding wheels 62. At the end of the rearward movement of the main operating handle 50 the cam 124 shifts the adding wheels 62 from mesh with the gears 53 back to engagement with the carry rack bars 63, but as described these rack bars have already been restored to normal the adding wheels 62 will be merely held by them in the position already set up in the adding wheels. Forward movement of the bail 90 also carries forwardly the restoring bar 93 and with it the tripped pawls 72 restoring them to the recesses 71 in the locking levers 65 and permitting these levers to be rocked clockwise by their springs 88 as soon as the recesses 70 in the shifted carry rack bars 63 come under the lateral lugs 69. This restores the lugs 69 into these recesses 70 thus again locking these carry rack bars in their normal positions.

Total taking operation

Figure 7:
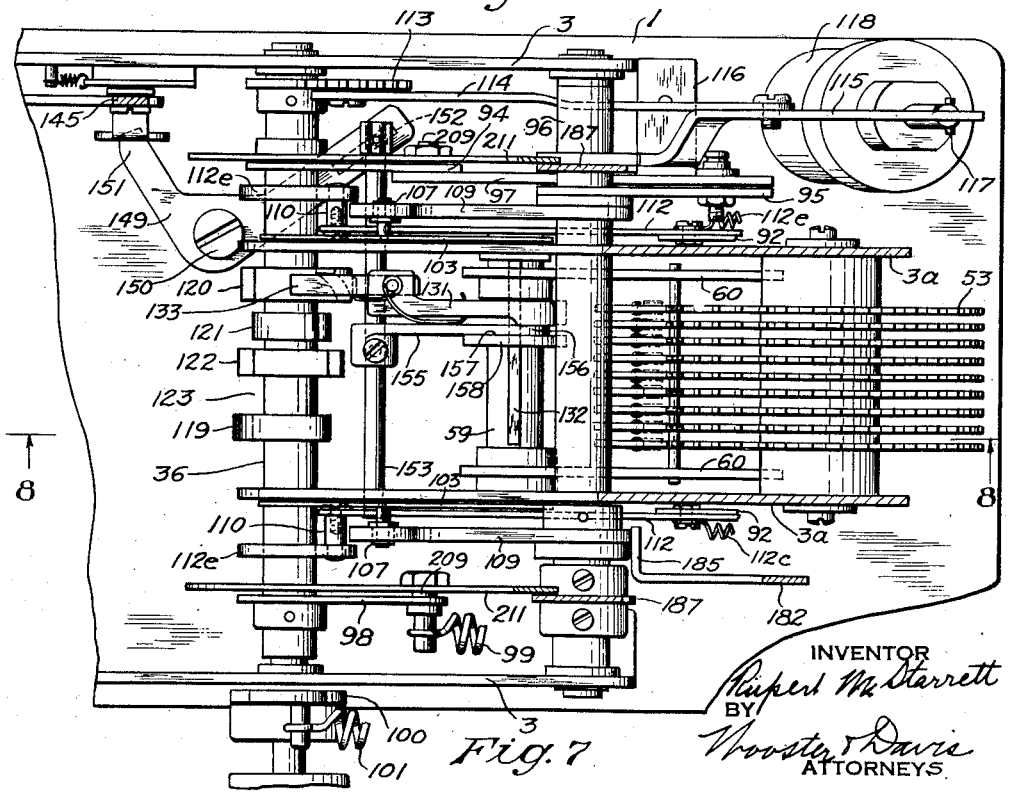
Fig. 7 is a top plan view of the parts immediately associated with the slidable mounted cam controlled mechanism.

After a number of successive amounts or items have been set up in the keyboard and carriage 4, and have been printed and likewise transferred to and accumulated in the adding wheels 62 as above described, if the operator wishes to strike the total of these numbers or items and print them on the tape he proceeds as follows:

He first makes a clearing and resetting stroke (goes through a blank cycle) by moving the main operating handle 50 forwardly and permitting it to return to its normal position without setting up anything more in the keyboard. This, as described immediately above, insures that all the carry operations are performed and the total amount transferred to and accumulated in the adding wheels 62. The operator then shifts the main control lever 145 rearwardly to the total taking position. In the illustration shown this is the position furthest to the rear as indicated in Fig. 1, and is also the position of Figs. 7 and 9. This brings the lever 145 to rest in a notch 237 (Fig. 6) in a spring controlled arm 238 pivotally mounted on the underside of the plate 239 of the keyboard. This lever has a forwardly and laterally extending arm 240 which at its free end is located under an extension 241 (Fig. 2) on the differential actuator bar blocking or limit plate 160 and which plate has a downwardly extending forward edge 242 normally lying in front of the upstanding stops 56 on the bars 54 to normally block their forward movement, but as lever 145 is moved rearwardly to the total taking position the arm 240 raises the forward end of the limit plate 160 about the pivotal mounting 161 of this plate thus unblocking the differential actuator or adding rack bars 54. At the same time this movement of lever 145 operates the bell crank 149 (Figs. 7 and 9) to shift the cam arm 131 along the key shaft 59 through the sliding rod 153 and the connecting arm 155 thereby positioning the fingers 133 and 134 on the cam arm 131 in alignment with the total taking cam member 120 (Figs. 7, 9 and 10).

In order to set the printing wheels 53 and the printing mechanism connected therewith in proper position to print on the tape the total amount which has been transferred to and set up in the adding wheels 62 this total amount must be transferred from these wheels 62 to the printing wheels 53. This is done by the operator now moving the main operating lever 50 forwardly its full movement and permitting it to return to its normal position. During the first part of this movement, as the main operating shaft 36 turns counterclockwise from the position of Fig. 9 the protuberance 125 on cam 120 engages the finger 134 rocking the shaft 59 to raise the adding wheels 62 from their lower position in mesh with the adding rack bars 63 to their upper position in mesh with the wheels 53 as shown in Fig. 10, and they remain in this position during the entire forward movement of the main operating lever as they are held there by the catch 165. During this forward movement of the main operating handle the protuberance 126 of the cam 120 moves by the finger 133 without affecting the arm 131, because one side of this protuberance 126 is inclined or curved as shown at 126a (Fig. 11), causing the finger 133 to be swung laterally to the right against the action of the spring 138 as shown in dotted lines Fig. 11, and as the main operating lever reaches its extreme forward position the end of this finger 133 is swung back by the spring 138 to position it behind the rear shoulder of the protuberance 126 as shown in Fig. 10 and full lines Fig. 11. As the carriage 4 is in its normal position during this forward movement of the main operating handle 50 and the forward edge of the adding rack bar limit or blocking plate 160 (Fig. 2) has been lifted out of the paths of the stops 56 on these bars 54, when the slotted arms 103 move rearwardly carrying with them the rod 105 the proper rack bars 54 move rearwardly under the action of their springs 57, thus rotating the wheels 53 in mesh therewith clockwise and turning the adding wheels 62 in which numbers have been set up and which are in mesh with the respective wheels 53 counterclockwise until the stop lug 87 on the tenth or 0 tooth of each adding wheel 62 engages or is limited on the top or right hand surface of the nose 86 on the pawl 83. The other adding wheels 62 in which no amount has been set up are already in this position with their lugs 87 against the pawls 83 as this is the normal position before any amount is set up in the adding wheels as previously described. In this position of the main control lever 145 the transverse bail 243 lies to the rear of and engages the rear edges of the tails of the pawls 83 preventing these pawls being turned clockwise on their pivots 82, and therefore the lugs 87 are stopped by the ends of the pawls 83 and are not permitted to pass by them in counterclockwise direction. Therefore each of the adding wheels 62 in which no amount has been set up is held against movement counterclockwise by its lug 87, and their wheels 53 do not move. However, the counterclockwise movement of each of the adding wheels 62 in which amounts have been set up is stopped as soon as the lug 87 of each of these wheels engages its corresponding pawl 83. The bail 243 is moved to this holding position by rearward movement of lever 145 through the connecting link 263. Thus this counterclockwise movement of each adding wheel 62 and therefore the movement of the wheel 53 in mesh therewith in a clockwise direction corresponds to the number of integers set up in that particular adding wheel, and therefore the number set up in the series of adding wheels 62 is transferred to the printing wheels 53 in mesh with these respective wheels.

Movement of the corresponding printing wheels 53 clockwise will raise the type bars 207 connected with these respective wheels, and as the rollers 209 engage the ends of the slots 210 in the levers 211 (Figs. 3 and 7) at the extreme limit of the forward movement of the handle 50 they will swing the levers 187 forwardly to trip the printing mechanism and cause operation of the bars 207 which have been shifted to print the total on the tape 188. As the handle 50 starts its rearward movement toward normal position the protuberance 126 (Fig. 10) of the cam 120 engages the end of the finger 133 shifting the adding wheels 62 away from mesh with the wheels 53 and to their normal position of rest in the adding rack bars 63. It will be noted that at this time all the adding wheels 62 have been shifted back to their normal or 0 position with the lugs 87 on the 0 or tenth tooth just rearwardly or to the right of the extension 86 of their respective pawls 83 as shown in Figs. 9 and 10. As the adding wheels 62 are shifted out of mesh with the wheels 53 they are no longer held by these latter wheels and the rack bars 54 are all moved rearwardly under the action of their springs 57. However, as the rod 105 is moved forwardly by the slotted arms 103 as the main operating handle 50 moves rearwardly to its normal position this rod 105 engages the forward ends of the slots 55 and carry all of the rack bars 54 forwardly to their normal position. This movement of these bars also carries the printing wheels 53 to their normal position, resetting the type bars and the printing mechanism in their normal positions in the manner previously described.

During this rearward movement of the main operating handle 50 a spring controlled roller cam 244 (Fig. 6) pivotally mounted on an extension 245 of a ratchet sector 246 contacts a depending roller 247 on an extension 248 on the notched arm 238 pushing the latter out of engagement with the main operating lever 145 and permitting it to be returned forwardly by action of a spring 147 to the normal or adding and listing position. At the same time, through the action of the bell crank lever 149 (Figs. 7 and 9) and associated parts shifting the cam arm 131, the fingers 133 and 134 are carried into alignment with the adding cam 119 and thus restore it to its regular listing and adding position. Movement of sector 246 in the opposite direction does not shift arm 238 as the roller 244 is on a one way lever 244a pivoted at 244b and held against a stop 244c by a spring 244d.

The link 263 is connected to the main control lever 145 by a stud or screw 264 extending through a slot 265 in the link. A spring 266 is connected to the screw and the link and therefore tends to position the screw in the left hand end of the slot but permits a certain amount of lost motion which permits the ball 243 to be clear of the pawls 83 in all positions of lever 145, except in its total and subtotal positions. In these latter positions there is a positive holding of the ball 243 in the pawl blocking position. The ball is carried by arms 267 and 268 pivoted on the side frames at 269, and arm 268 is connected to the link 263.

Temporary or sub-total operation

It is often desirable that a temporary or sub-total be printed in the midst of adding a column of figures to assist the operator in keeping informed as the work progresses. This operation is the same as taking a total up to the point of printing the total amount on the tape, but instead of clearing and resetting the adding wheels in normal 0 position after this total has been taken the total amount is retransferred from the printing wheels 53 back into and again set up in the adding wheels 62 so that they are the same as before this subtotal operation was taken. Before taking this subtotal the main operating lever 145 is positioned in the subtotal position, which is just forwardly of the total position in the notch 249 of the arm 238. As this lever is moved to this position the bell crank 149 (Fig. 7) is operated to shift the arm 131 into alignment with the subtotal cam 121 which is shaped substantially as shown in Figs. 7 and 12. On this cam the protuberance 127 is the same as the protuberance 125 of the total cam 120 and occupies the same position about the shaft 36 so that at the beginning of the forward stroke of the main operating handle 50 it engages the end 144 of the finger 134 operating the shaft 59 and the arms 60 to raise the adding wheels 62 from their lower position in mesh with the adding rack bars 63 to their upper position in mesh with the printing wheels 53. During the remainder of the forward movement of the main operating handle the adding wheels 62 are held in mesh with the wheels 53 by the catch 165 and the accumulated number or total which has been set up in the adding wheels 62 is transferred to the printing wheels 53, the same as above described in the operation of taking a total. The main control lever 145 while in this subtotal position unlocks the differential actuator or adding rack bars 54 by holding the forward edge of the limit plate 160 (Fig. 2) out of the path of the stops 56 on these bars the same as in the total taking operation. Also, the ball 243 is held in engagement with the upper leg of the pawls 83 so that these pawls limit the reverse or counterclockwise movement of the adding wheels 62 the same as in taking a total. The total transferred from the adding wheels 62 to the wheels 53 is printed on the tape at the end of the forward movement of the main operating lever in the same manner as previously described in the operation of taking a total. However, instead of the adding wheels 62 being shifted out of mesh with the printing wheels 53 at the beginning of the reverse or rearward movement of the main operating handle 50 as previously described in the operation of taking a total, these wheels 62 now remain in mesh with the printing wheels 53 during this return movement so that the total which has been transferred from the adding wheels 62 to the wheels 53 is now transferred back from the wheels 53 to the adding wheels 62 and is again set up in these adding wheels 62 the same as it was before the subtotal was taken.

As the main operating lever reaches its extreme rearward or normal position and after the total has again been transferred back into and set up in the adding wheel 62, the protuberance 128 on the cam 121 engages the end of the finger 133 and throws the arms 60 downward to carry the adding wheels 62 out of mesh with the printing wheels 53 and back into mesh with the adding rack bars 63. At the same time the roller 244 (Fig. 6) engages the roller 247 releasing the arm 238 permitting the main control lever 145 to be shifted forwardly to the adding and listing position, so that the operator can now go on with the operation of listing additional numbers or items and causing them to be accumulated with and added to the total number already accumulated in the adding wheels 62.

In other words, for taking a subtotal the mechanism is so arranged and operated as to temporarily transfer the accumulated sum set up in the adding wheels 62 into the printing wheels 53, causes the number to be printed, and retransfers this amount back into the adding wheels, at the end of which operation the main control lever 145 is automatically restored to the normal position as described.

Non-add inclusion

Provision may also be made for listing a non-add inclusion if such is desired, as for example, including in the printed column of numbers pre-dated checks the amount of which it is desired to print in the column of figures to secure a record, but yet prevent the same being included in the sum total. For this operation the main control lever 145 is shifted to the notch 250 in the arm 238 which through the bell crank 149 shifts the cam arm 131 to bring the fingers 133 and 134 opposite the space 123 (Fig. 7) on the main operating shaft 36 where there is no operating cam thus rendering the adding wheels 62 inoperative. Thus when the desired amount is set up in the keyboard and the main operating handle 50 is moved forwardly the proper differential actuator bars 54 and corresponding wheels 53 are shifted to proper position and this amount printed on the tape as in any listing operation, but the adding wheels 62 are not affected. After this operation the return of the main operating lever to its rearward or normal position restores the actuated parts to their original positions. This action also returns the main operating lever 145 to its normal or adding and listing position for the continuation of listing and adding of further numbers to the total already accumulated or set up in the adding wheels 62.

Subtraction

The mechanism for performing subtraction operations is shown more clearly in Figs. 15 and 16, and for simplicity and to avoid duplication in the drawings the subtraction mechanism proper is not shown in the other views, but the elements are shown broken away to indicate where they are applied. This mechanism includes an extension 251 on the lower arm of each of the locking levers 65 which extends upwardly at 252 and carries a lateral stop pin or roller 253. Mounted on the transverse shaft 254 extending between the side frames 3a of the adding section are secondary carry release levers 255, one for each of the carry release levers 65, and each having an inclined cam surface 256 to engage the rollers 253 for operation of the locking levers 65 at certain times, as will presently be described. The lever 255 also has an extending lug 257 providing a shoulder 258 adapted to be moved under certain conditions into the path of movement of a lateral stop or lug 259 on the carry rack bar 63 immediately in front of, or that is, to the right of the lever 255. The other arm 260 of the lever 255 lies in the path of movement of a lug 261 extending laterally to the left and outwardly on a tooth of the respective adding wheel 62 next to the right of each lever 255. This lug 261 is so located that when the parts are in their normal positions as shown in Fig. 15 and the wheel 62 carrying it is in the zero position then this lug lies immediately under the forward end of its lever 255 as shown. It is out of alignment with the pawls 83 so as not to trip the levers 65.

In making a subtraction, without taking a clearing stroke of the main operating lever, the main control lever 145 is first shifted to its proper notch 262 in the arm 238, which through the action of the bell crank 149 shifts the fingers 133 and 134 on the cam lever 131 into alignment with the subtraction cam 122 on the main operating shaft 36. This cam comprises the protuberances 129 and 130 (Fig. 15) which are the same as those of the total taking cam 120. The number desired to be subtracted is then set up in the keyboard and the main operating lever 50 is swung to the forward position and then permitted to return to its normal position. At the beginning of its forward movement the protuberance 129 (Fig. 15) on the cam 122 engages the finger 134 and swings the arms 60 upwardly to carry the adding wheels 62 out of mesh with the carry rack bars 63 and into mesh with the differential actuator wheels 53. As the main operating handle continues its forward movement the differential actuator bars 54 which have been released by the set up in the keyboard move rearwardly, or to the right as shown in Fig. 15, the distance corresponding to the stop pins 5 in carriage 4 corresponding to the number set up. During this movement the released bars 54 rotate the corresponding wheels 53 to the right or clockwise, and as the adding wheels 62 are in mesh therewith they will rotate the corresponding adding wheels 62 to the left or counterclockwise, thus subtracting from the number accumulated in the adding wheels 62 the subtrahend which was set up in the keyboard. If the number subtracted is such as not to require a carry the corresponding adding wheels 62 are merely reversed or turned counterclockwise the number of digits required for each wheel. At the extreme forward movement of the main operating lever or at the beginning of its reverse movement toward normal position, with the present construction at the beginning of this reverse movement, the protuberance 130 on the cam 122 engages the end of the finger 133 and shifts the adding wheels 62 out of mesh with the wheels 53 and back to normal position in mesh with the carry rack bars 63. At the end of the forward movement of the main operating lever the subtrahend was printed on the tape by the printing mechanism the same as described for the other operations.

If the number subtracted was sufficiently large or of the character to require a carry in the adding wheels the operation is as follows:

Assume for example that the total number accumulated in the adding wheels 62 is 100 and we wish to subtract 1 from it. With this number the first two right hand wheels 62 are in the 0 position with the stop lug 87 immediately to the right of the pawl 83 while the third wheel is one tooth clockwise from this position, or in the 1 position. Now when the number 1 is set up in the keyboard and the main operating lever 50 is moved forwardly, at the beginning of this movement the cam lug 129 engages the finger 134 and shifts the arms 60 upwardly to carry the adding wheels 62 out of mesh with the rack bars 63 and into mesh with the wheels 53 as previously described. During this movement of the wheels 62 the lug 261 on any wheel which is in the 0 position will engage the arm 260 of the secondary carry release lever 255 immediately to the left of this wheel and shift this lever to the dotted line position of Fig. 15 bringing the cam 256 adjacent to the roller 253 on the corresponding locking lever 65 and carrying the shoulder 258 on this lever 255 to a position in front of the lug 259 on the next carry rack bar 63 to the right of this lever. As the main operating lever 50 continues its forward movement the first bar 54 moves rearwardly or to the right one tooth corresponding to the number 1 set up in the keyboard. On this movement it turns the first gear 53 to the right or clockwise one tooth, and this movement turns the first adding wheel 62 in mesh therewith backwards or counterclockwise one tooth, or that is, from the 0 to the 9 position. This carries the lug 87 past the pawl 83, but as this pawl may swing to the right without tripping the lever 65 this lug 87 merely moves to the 9 position without tripping anything. However, during this backward movement of the first wheel 62 the lug 261 thereon lifts the arm 260 on the first lever 255 from the dotted line position of Fig. 15 or full line position of Fig. 16 to a position corresponding to the dotted line position of Fig. 16, and by action of its cam 256 on the roller 253 of the first locking lever 65 this right hand portion of this first carry rack bar locking lever 65 is raised lifting its lug 69 from the recess 70 in the second carry rack bar 63, thus releasing this second bar and permitting it to be shifted forwardly to the dotted line position of Fig. 16. During this forward movement the lug 259 on this bar engages the shoulder 258 on the second secondary carry release lever 255 shifting it to the dotted line position of Fig. 16 and thus through its cam 256 releasing the second locking lever 65. As the third adding wheel 62 was in the 1 position its lug 261 did not shift its (the third) secondary carry release lever 255 during the upward movement of the adding wheels and therefore this third lever 255 was not set for a release. In other words, only the adding wheels 62 which are in the 0 position set up the levers 255 on the upward movement of these wheels in position for a release.

It will be understood that now the first adding wheel 62 is in the 9 position, the second in the 0 position, and the third is in the 1 position. Now as the main operating lever 50 begins its reverse or rearward movement to normal position the lug 130 of the cam 122 engages the finger 133 and shifts the adding wheels 62 downwardly out of mesh with the wheels 53 and into mesh with the carry rack bars 63, but it will be remembered that before this time the second and third carry rack bars 63 which were released have been shifted forwardly one tooth by their springs 89, the other carry rack bars remaining in their normal positions. Now as the main operating lever continues its rearward movement the restoring bail 90 moves to the right or rearwardly and by engaging the shoulders 91 on the two released rack bars 63 shifts these two bars to the right or rearwardly one tooth to their normal positions. During this movement the second carry rack bar (which is the first movable bar) turns the second adding wheel 62 backward or counterclockwise one tooth to the 9 position, and at the same time the third carry rack bar which was also released turns the third adding wheel 62 backwardly or counterclockwise shifting it from the 1 position to the 0 position. It will therefore be seen that now the first two wheels 62 of the accumulator are each in the 9 position giving the number 99 while all the other wheels 62 are in the 0 position. If it is desired to print this number on the tape the main control lever 145 may be shifted to either the total or subtotal position and the main operating lever 50 operated accordingly as previously described, this action transferring the number to the wheels 52 and printing it on the tape. If no printing stroke or if a subtotal is taken and the main control lever 145 is shifted to the adding position, other numbers may be added into this remainder in the adding wheels the same as previously described.

The secondary carry release levers 255 are normally biased against a stop rod 271 by springs 272. The free end of each lever arm 260 has an inclined cam surface 273 which when engaged by lug 261 as an adding wheel 62 rotates clockwise will raise the free end of the lever arm 260 to permit the lug 261 to pass without tripping the carry racks or pawls. If the lug 261 should engage the cam surface 273 when the wheels 62 are in engagement with the wheels 53 the action follows, because as will be seen from Fig. 15 the lug 261 is so spaced from lug 87 that when wheels 62 move clockwise lug 87 first trips the lever 65 so that as lug 261 shifts lever 255 it does not affect the lever 65.

It will thus be seen that this machine will directly subtract without changing the action of the carry rack bars. This is possible because the carry rack bars act separately from the differential actuator or adding rack bars. In other words, the carry rack bars being the normal position for the adding wheels allows me to get the carry in both the forward and the reverse (resetting) movements, thus giving the carry (carrying one point into the wheels) in both addition and subtraction by the same elements. Thus the action of the carry rack bars is the same in adding as in subtraction and no reversing of spring tension is required.

Having thus set forth the nature of my invention, what I claim is:

1. A calculating machine comprising a series of differential actuator gears, a series of normally stationary longitudinally movable carry racks separate from said gears, an accumulator comprising a series of adding wheels comprising gears normally in mesh with said racks before the machine is operated to thus determine the position of the wheels, means for shifting the adding wheels from the racks to mesh with the differential actuator gears, means for holding the racks in normal stationary position, springs tending to shift the racks, and said racks when in normal position retaining the adding wheels in normal position and movable from normal position to carry one unit into the wheels for addition and movable to normal position to carry one unit into the wheels for subtraction, and means on the adding wheels for releasing said holding means.

2. A calculating machine comprising a series of differential actuator gears, a series of normally stationary longitudinally movable carry racks separate from said gears, an accumulator comprising a series of adding wheels comprising gears normally in mesh with said racks, means for shifting the adding wheels from the racks to mesh with the differential actuator gears, and said racks when in normal position determining the normal position for the adding wheels and movable from said normal position to carry one unit into the wheels for addition and capable on movement to normal position of carrying one unit into the wheels for subtraction, and means on the adding wheels to control operation of said racks.

3. A calculating machine comprising a series of differential actuator gears, a series of longitudinally movable carry racks, a releasable locking means for each rack to hold it in normal stationary position, a series of adding wheels comprising gears normally in mesh with said racks, means for shifting the adding wheels from the racks to mesh with the differential actuator gears for transferring a number set up in the gears to the adding wheels, means on each adding wheel adapted when the wheel is rotated in one direction in adding operations to trip the locking means of the rack for the adding wheel of the next higher order when more than nine units are placed in a wheel, a series of secondary carry releases each capable of tripping one of said locking means, means on each wheel adapted on operation of the wheel in the opposite direction on a subtracting operation to cock said secondary release for the locking means of the next higher order if the wheel passes to the zero position and to release said secondary release if the wheel passes from the zero to the nine position, means on a rack of the next lower order capable of operating the cocked secondary release to trip the locking means, and means for restoring the elements to normal position and shifting the released rack to turn the corresponding adding wheel one unit.

4. A calculating machine comprising a series of differential actuator gears, a totalizer comprising a series of adding wheels capable of meshing with said gears, and a carry mechanism comprising a plurality of normally stationary movable racks cooperating with said adding wheels and said racks capable of giving a carry in both forward movement from normal position and reverse movement of the said racks to normal position thus giving a carry in both addition and subtraction operations, and means on the adding wheels to control operation of said racks.

5. A calculating machine comprising a series of differential actuator gears, a series of longitudinally movable carry racks, a releasable locking means for each rack to hold it in normal stationary position, a series of adding wheels comprising gears normally in mesh with said racks, means for shifting the adding wheels from the racks to mesh with the differential actuator gears for transferring a number set up in the gears to the adding wheels, means on each adding wheel to trip the locking means of the rack for the adding wheel of the next higher order when more than nine units are placed in a wheel, a secondary carry release for unlocking each rack, means on each of the adding wheels capable of cocking the secondary release for the rack of the next higher order on movement of the adding wheels to mesh with the differential actuator gears, means on individual racks capable of operating the cocked release of a rack of the next higher order, and means for restoring the elements to normal position and shifting a released rack to place a unit in its adding wheel.

6. A calculating machine comprising a series of differential actuator gears, a series of longitudinally movable carry racks separate from said gears, an accumulator comprising a series of adding wheels comprising gears normally in mesh with said racks, separate means for holding each rack in normal stationary position, springs tending to shift the racks, means on each adding wheel to trip the holding means for the rack of the next higher order to permit shifting of the rack to effect a carry, a series of secondary carry releases one for releasing each rack, means for shifting the adding wheels from the racks to mesh with the differential actuator gears, means on the respective adding wheels capable of cocking the secondary release for the rack of the next higher order by said shifting movement, and means on individual racks capable of operating the cocked release of a rack of the next higher order by movement of said racks.

7. A calculating machine comprising a series of differential actuator gears, a totalizer comprising a single series of adding wheels capable of meshing with said gears, a carry mechanism capable of cooperating with said adding wheels to give a carry in both forward and reverse movement of said mechanism from and to a normal stationary position thus giving a carry in both addition and subtraction operations, a main operating shaft, means operated by said shaft capable of shifting the adding wheels to and from cooperation with the differential actuator gears and the carry mechanism in certain timed relation with operation of said shaft to effect said operations.

8. A calculating machine comprising a series of differential actuator gears, a series of normally stationary longitudinally movable carry racks, a releasable locking means for each rack to hold it in its normal stationary position, a series of adding wheels comprising gears normally in mesh with said racks before the machine is operated to thus determine the position of the wheels, a main operating shaft, means operated by said shaft for shifting the adding wheels from the racks to mesh with the differential actuator gears for transfer of numbers between said gears and wheels, means on each adding wheel to trip the locking means of the rack for the adding wheel of the next higher order when more than nine units are placed in a wheel, said shifting means also capable of operating to restore the wheels to normal position in certain timed relation with operation of said shaft, and means operated by said shaft to shift a released rack to add one unit to its adding wheel.

9. A calculating machine comprising a series of differential actuator gears, a series of normally stationary longitudinally movable carry racks separate from said gears, an accumulator comprising a single series of adding wheels comprising gears normally in mesh with said racks before the machine is operated to thus determine the position of the wheels, a main operating shaft, means operated by said shaft to shift the adding wheels from the racks to mesh with the differential gears and from the gears back to mesh with the racks in certain timed relation with operation of said shaft, means for holding the racks in normal stationary position, springs tending to shift the racks, means on each adding wheel to trip the holding means on the rack of the next higher order to permit shifting of the rack to effect a carry, and means operated by the shaft to restore a shifted rack to normal position.

10. A calculating machine comprising a series of differential actuator gears, a series of normally stationary longitudinally movable carry racks separate from said gears, an accumulator comprising a series of adding wheels comprising gears normally in mesh with said racks, a main operating shaft, means operated by said shaft capable of shifting the adding wheels from the racks to mesh with the differential actuator gears in certain timed relation with operation of said shaft, said racks when in normal position determining the normal position for the adding wheels and movable from said normal position to carry one unit into the wheels for addition and capable on movement to normal position of carrying one unit into the wheels for subtraction, and means operated by the shaft to restore the racks to normal position.

11. A calculating machine comprising a series of differential actuator gears, a series of longitudinally movable carry racks, a releasable locking means for each rack to hold it in normal stationary position, a series of adding wheels comprising gears normally in mesh with said racks, a main operating shaft, means operated by said shaft for shifting the adding wheels from the racks to mesh with the differential actuator gears for transfer of numbers between said wheels and gears, means on each adding wheel adapted when the wheel is rotated in one direction in adding operations to trip the locking means of the rack for the adding wheel of the next higher order when more than nine units are placed in a wheel, a secondary carry release for each rack capable of tripping said locking means, means on each wheel adapted on operation of the wheel in the opposite direction on a subtracting operation to cock the secondary release of the next higher order if the wheel passes to the zero position, means on a rack of the next lower order capable of operating the cocked secondary release to trip the locking means, and means operated by said shaft for restoring the elements to normal and shifting the released rack to turn the corresponding adding wheel one unit.

12. A calculating machine comprising a series of differential actuator gears, a totalizer comprising a series of adding wheels capable of meshing with said gears, a carry mechanism cooperating with said adding wheels comprising a series of longitudinally movable racks and a locking means for each rack, a secondary carry release for each rack for unlocking said rack, a main operating shaft, means operated by said shaft to shift the adding wheels from the racks to mesh with the gears, means on each adding wheel capable of cocking a secondary release on said movement, means on individual racks capable of operating the cocked release of a rack of the next higher order, and means operated by the shaft for restoring the parts to normal.

13. A calculating machine comprising a series of differential actuator gears, a carry mechanism comprising a series of normally stationary carry rack bars, a totalizer comprising a single series of adding wheels normally in mesh with said racks and capable of movement between the gears and the racks for meshing with said gears and racks respectively, springs tending to longitudinally shift said racks, a locking lever to hold each rack in normal position, a lug on each adding wheel to trip the locking lever for the rack of the next higher order as the wheel passes from the nine to the zero position, a pawl to hold the lever in released position, a main operating shaft, means operated by said shaft to shift the adding wheels between the racks and the differential actuator gears in timed relation with the operation of the shaft, and means operated by the shaft to restore the racks and the pawls to normal positions.

14. A calculating machine comprising a series of longitudinally slidable differential actuator rack bars, a series of differential actuator gears in mesh therewith, a series of normally stationary longitudinally movable carry racks spaced from said actuator rack bars and gears, means for locking the carry racks in normal position, a totalizer comprising a series of adding wheels capable of meshing with either the carry racks or the gears, means for shifting said racks to and from normal position, said racks being capable on movement from normal position of carrying one unit into the wheels for addition and on movement to normal position of carrying one unit into the wheels for subtraction, means for shifting the adding wheels between the carry racks and the gears for transfer operations, and means operated by the adding wheels for tripping the carry racks for operation.

15. A calculating machine comprising a series of toothed adding wheels, a normally stationary carry rack normally in mesh with each wheel, a series of differential actuator gears, means for shifting the adding wheels between engagement with the racks and the actuator gears, means locking the carry racks in normal stationary position, means for shifting said racks to and from normal position, said racks being capable on movement from normal position of carrying a unit into the wheels for addition and on movement to normal position of carrying one unit into the wheels for subtraction, and means controlled by the adding wheels by rotative movements in opposite directions to control release and operation of said racks for movement in the same direction from their normal position in both addition and subtraction.

16. A calculating machine comprising a series of differential actuator gears, a totalizer comprising a series of adding wheels capable of meshing with said gears, a carry mechanism cooperating with said adding wheels comprising a series of longitudinally movable racks and a locking means for each rack, a secondary carry release for each rack for unlocking said locking means for each rack, means for shifting the adding wheels from the racks to mesh with the differential gears, means on the respective adding wheels capable of cocking the secondary release of the rack of the next higher order by said shifting movement of the adding wheels and also capable on subsequent movement of the actuator gear to operate the secondary release to unlock the locking means for that rack, and means on individual racks capable of operating the cocked release of a rack of the next higher order.

17. A calculating machine comprising a series of differential actuator gears, a series of longitudinally movable carry racks separate from said gears, an accumulator comprising a series of adding wheels comprising gears normally in mesh with said racks, a means for holding each rack in normal stationary position, springs tending to shift the racks, means on each adding wheel to trip the holding means for the rack of the next higher order to permit shifting of the rack to effect a carry, a secondary carry release for tripping each holding means, means for shifting the adding wheels from the racks to mesh with the differential actuator gears, means on each adding wheel capable of cocking a secondary release by said shifting movement while an adding wheel is in the zero position, means on individual racks capable of operating the cocked release of a rack of the next higher order by movement of said racks, and means to shift a released rack back to normal while in mesh with an adding wheel to shift said wheel one unit.

18. In a calculating machine, a transfer rack, a latch to hold the rack in a fixed position, an adding pinion, means on said pinion capable of camming action on said latch to release the latch for a carry on an adding operation, means for shifting the released rack, a secondary release capable of releasing said latch on a subtracting operation, a second means on said pinion capable of cocking the secondary release, and means on the transfer rack capable of operating the cocked secondary release of the next higher order on movement of said rack after its release.

19. In a calculating machine, an operating lever, an adding pinion, a transfer mechanism including a movable transfer rack, a spring always tending to shift the rack in one direction, a latch locking said rack in normal position, means operated by said pinion capable of releasing said latch and means operated by movement of a transfer rack of a next lower order for releasing said rack, a detent for holding the latch in released position for an adding carry, a resetting means for resetting the latch detent on forward stroke of the operating lever and resetting the transfer segment on its return stroke, and the transfer rack capable on its resetting movement of borrowing a unit on subtraction from the pinion.

20. A calculating machine comprising a series of differential actuator gears, a totalizer comprising a series of adding wheels capable of meshing with said gears, a carry mechanism cooperating with said adding wheels comprising a series of longitudinally movable racks normally in mesh with the respective adding wheels and a locking means for each rack, a secondary carry release for each rack for unlocking said locking means for said rack, means for shifting an unlocked rack, means for shifting the adding wheels from the racks to mesh with the differential gears, means on the respective adding wheels capable of cocking the secondary release for the rack of the next higher order by said shifting movement of the adding wheels, and means on individual racks capable of operating the cocked release of a rack of the next higher order.

21. In a calculating machine, a series of differential actuator gears, a totalizer comprising a series of adding wheels comprising gears capable of meshing with said actuator gears, a series of normally stationary carry racks normally in mesh with said wheels, means for shifting the adding wheels from the racks to mesh with the differential actuator gears, and said racks being timed to simultaneous carry when meshed with the totalizer wheels on adding operations and to simultaneous release when the totalizer wheels are out of mesh therewith on subtraction.

RUPERT M. STARRETT.